United States Patent
Li et al.

(10) Patent No.: US 10,102,038 B2
(45) Date of Patent: Oct. 16, 2018

(54) DATA MINING METHOD AND NODE

(71) Applicant: HUAWEI TECHNOLOGIES CO., LTD., Guangdong (CN)

(72) Inventors: Chen Li, Shenzhen (CN); Fangshan Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 108 days.

(21) Appl. No.: 15/391,350

(22) Filed: Dec. 27, 2016

(65) Prior Publication Data

US 2017/0109207 A1    Apr. 20, 2017

Related U.S. Application Data

(63) Continuation of application No. PCT/CN2015/080677, filed on Jun. 3, 2015.

(30) Foreign Application Priority Data

Jun. 27, 2014 (CN) .......................... 2014 1 0302143

(51) Int. Cl.
*G06F 9/46* (2006.01)
*G06F 9/50* (2006.01)
*G06F 17/30* (2006.01)

(52) U.S. Cl.
CPC ........ *G06F 9/505* (2013.01); *G06F 17/30539* (2013.01); *G06F 2216/03* (2013.01)

(58) Field of Classification Search
CPC . G06F 9/505; G06F 17/30539; G06F 2216/03
See application file for complete search history.

(56) References Cited

U.S. PATENT DOCUMENTS 5,630,129 A    5/1997  Wheat
2004/0244006 A1    12/2004  Kaufman et al.
(Continued)

FOREIGN PATENT DOCUMENTS

CN    101184031 A    5/2008
CN    101605092 A    12/2009
(Continued)

OTHER PUBLICATIONS

European Search Report in the corresponding European Application (application No. 15811909.9).
(Continued)

*Primary Examiner* — Camquy Truong
(74) *Attorney, Agent, or Firm* — Kilpatrick Townsend & Stockton LLP

(57) ABSTRACT

A data mining method and a node are provided. The method includes: obtaining predicted execution time of each computing subnode in a current round of iteration of a task, and allocating a corresponding volume of task data to the computing subnode; after the current round of iteration is executed, collecting execution status information of each computing subnode in the current round of iteration, and accordingly determining whether the task data volume of each computing subnode needs to be adjusted in a next round of iteration; and performing the next round of iteration according to the adjusted task data volume. Therefore, a corresponding volume of task data can be allocated according to a capability of each computing subnode. In this way, some unnecessary load balancing processes can be avoided, network consumption can be reduced, and data mining performance of a system can be improved.

21 Claims, 10 Drawing Sheets

(56) References Cited

U.S. PATENT DOCUMENTS

2007/0157206 A1    7/2007  Rakvic et al.
2011/0321058 A1*  12/2011  Schmidt .................. G06F 9/505
                                                      718/105
2012/0166514 A1    6/2012  Manoj et al.

FOREIGN PATENT DOCUMENTS

| CN | 100581138 C | 1/2010 |
| CN | 101764835 B | 6/2010 |
| CN | 102831012 A | 12/2012 |
| CN | 103257896 A | 8/2013 |

OTHER PUBLICATIONS

Yucheng Low, et al: "Distributed GraphLab: A Framework for Machine Learning and Data Mining in the Cloud"; Aug. 27-31, 2012; 12 pages; 2012 VLDB Endowment, vol. 5, No. 8; Istanbul, Turkey.

Xiang He, et al.: "Improved Task Scheduling Mechanism for MapReduce in Heterogeneous Environment", issued Nov. 2013; 5 pages; Application Research of Computers, vol. 30, No. 11.

Shisheng Zhong, et al.: "Prediction of Workflow Time by Method of Weighted Assignment Based on Linear Regression'", Dec. 27, 2005; 4 pages; Application Research of Computers, vol. 2, 2007.

\* cited by examiner

DATA MINING METHOD AND NODE

CROSS-REFERENCE TO RELATED APPLICATIONS

This application is a continuation of International Application No. PCT/CN2015/080677, filed on Jun. 3, 2015, which claims priority to Chinese Patent Application No. 201410302143.8, filed on Jun. 27, 2014. The disclosures of the aforementioned applications are hereby incorporated by reference in their entireties.

TECHNICAL FIELD

Embodiments of the present invention relate to communications technologies, and in particular, to a data mining method and a node.

BACKGROUND

Big data (big data), or referred to as mega data, refers to data sets involving such a huge volume of data that it cannot be fetched, managed, processed, and arranged within a proper time by using a conventional software tool. With the advent of the cloud era, big data (Big data) attracts increasing attention, and how to obtain useful information and knowledge from big data becomes the focus of the industry. Data mining (Data Mining) is a technology for searching for hidden information from a large volume of data by using an algorithm. The data mining generally achieves the foregoing objective by using many methods such as statistics, online analysis and processing, information retrieval, machine learning, an expert system (relying on past experience and rules), and model identification.

In a data mining process, modeling and analysis generally need to be performed on massive data. A common modeling method includes an iterative machine learning algorithm, such as linear regression, logistic regression, a neural network, or a decision tree. A learning process is executed on data repeatedly, to continuously update a particular parameter of a data mining task. Each time a round of iterative computation is complete, an effect of a temporary model generated is estimated. When a particular condition is met, an iterative process ends. Otherwise, the iterative process is executed repeatedly.

However, big data has a feature of a big data volume, which generally reaches a TB (1 TB=1012 B) or PB (1 PB=1000 TB) level, and is beyond a computing capability of a civil computer. Therefore, a high performance computer and a distributed cluster are generally used to perform batch processing. That is, a mining task of big data is executed in a distributed cluster computing environment by using the foregoing iterative algorithm, and each round of iterative computing task is allocated to computing subnodes. When the computing subnodes complete respective computing tasks, temporary results of all the subnodes are gathered, and an effect of an obtained combination model is estimated. When a particular condition is met, an iterative process ends. Otherwise, a new computing task is reallocated to the computing subnodes, and the iterative process is repeated.

Since computing subnodes in a distributed cluster may have different computing capabilities, computing resources cannot be fully used and computing efficiency is reduced. Therefore, to improve performance of an entire mining system, in the prior art, a load balancing technology is used. When each round of iterative task is executed, a quantity of tasks of each computing subnode is dynamically adjusted according to a load status of the computing subnode. For example, in a process of executing an iterative task, when it is found that some computing subnodes have completed the iterative task, and some computing subnodes have not completed the iterative task, it is considered that the nodes that have completed the task are idle nodes, and the nodes that have not completed the task are overloaded nodes. In this case, some task data on the overloaded nodes is transferred to the idle nodes. However, in the prior art, a volume of input task data of each computing subnode in each round of iteration is unchanged, load balancing in each round of iterative task is independent with respect to a next round of iteration. That is, when the next round of iterative task is executed, load balancing is needed to be performed again. Because data needs to be transferred between nodes during load balancing, unnecessary network consumption is increased, and data mining performance of a system is reduced.

SUMMARY

Embodiments of the present invention provide a data mining method and a node, so as to reduce network consumption, and improve data mining performance of a system.

According to a first aspect, an embodiment of the present invention provides a central node, applied to a data mining system, where the central node includes:

a time obtaining unit, configured to obtain predicted execution time of each computing subnode in the $N^{th}$ round of iteration of a task;

an allocation unit, configured to reallocate task data to each computing subnode according to the predicted execution time of each computing subnode, where the task data is a part or all of data in an obtained to-be-mined sample data set;

an information obtaining unit, configured to: after each computing subnode completes the $N^{th}$ round of iteration of the task according to the allocated task data, if the task has not ended, obtain execution status information of each computing subnode in the $N^{th}$ round of iteration of the task; and a first determining unit, configured to: determine, according to the execution status information of each computing subnode, whether load balancing needs to be performed in the $(N+1)^{th}$ round of iteration of the task, where if load balancing needs to be performed, after 1 is added to a value of N, the step of obtaining predicted execution time of each computing subnode in the $N^{th}$ round of iteration of the task to the step of determining, according to the execution status information of each computing subnode, whether load balancing needs to be performed in the $(N+1)^{th}$ round of iteration of the task are repeated; and if load balancing does not need to be performed, each computing subnode executes the $(N+1)^{th}$ round of iteration of the task according to the task data that is allocated to the computing subnode in the $N^{th}$ round of iteration of the task, where N is a positive integer, and a start value of N is 1.

With reference to the first aspect, in a first possible implementation manner, when N is equal to 1, the time obtaining unit is specifically configured to:

obtain the predicted execution time of each computing subnode according to a distribution characteristic parameter of the sample data set and a computing resource of each computing subnode, where the distribution characteristic parameter of the sample data set includes: an average value, a variance, a quantity of different values, and a value range that are of values, in a same field, of data in the sample data set; and the computing resource of each computing subnode includes: at least one of a CPU frequency or a memory capacity of the computing subnode.

With reference to the first aspect, in a second possible implementation manner, when N is greater than 1, the time obtaining unit is specifically configured to:

use actual execution time at which each computing subnode executes the $(N-1)^{th}$ round of iteration of the task as the predicted execution time of the computing subnode in the $N^{th}$ round of iteration of the task.

With reference to any one of the first aspect to the second possible implementation manner of the first aspect, in a third possible implementation manner, the allocation unit includes:

a node selection unit, configured to determine a computing subnode whose predicted execution time is greater than standard execution time as an overloaded node, and determine a computing subnode whose predicted execution time is less than the standard execution time as an idle node;

a unit for determining a to-be-transferred task volume, configured to obtain a proportion of tasks to be transferred from each overloaded node according to predicted execution time of each overloaded node and the standard execution time, and obtain, according to the proportion of tasks to be transferred from each overloaded node, a volume of task data that needs to be transferred from each overloaded node;

a unit for determining a to-be-received task volume, configured to obtain a proportion of tasks to be received by each idle node according to predicted execution time of each idle node and the standard execution time, and obtain, according to the proportion of tasks to be received by each idle node, a volume of task data that can be received by each idle node; and a transfer unit, configured to sequentially transfer out, according to a volume, corresponding to the overloaded node, of task data that needs to be transferred, task data of each overloaded node in a descending order of predicted execution time of overloaded nodes, and sequentially transfer the task data into at least one idle node, which is sequenced in an ascending order of predicted execution time of idle nodes, according to the volume of task data that can be received by each idle node, until all task data that needs to be transferred from the overloaded nodes is transferred completely.

With reference to the third possible implementation manner of the first aspect, in a fourth possible implementation manner, the unit for determining a to-be-transferred task volume is specifically configured to:

divide a difference between the predicted execution time of each overloaded node and the standard execution time by the standard execution time, to obtain the proportion of tasks to be transferred from the overloaded node; and multiply a task data volume of task data stored on each overloaded node by the proportion of tasks to be transferred from the overloaded node, to obtain the volume of task data that needs to be transferred from the overloaded node; and the unit for determining a to-be-received task volume is specifically configured to:

divide an absolute value of a difference between the predicted execution time of each idle node and the standard execution time by the standard execution time, to obtain the proportion of tasks to be received by the idle node; and multiply a task data volume of task data stored on each idle node by the proportion of tasks to be received by the idle node, to obtain the volume of task data that can be received by the idle node.

With reference to any one of the first aspect to the fourth possible implementation manner of the first aspect, in a fifth possible implementation manner, the execution status information of each computing subnode in the $N^{th}$ round of iteration of the task includes: at least one of actual execution time, a computing resource usage, or a task data volume of each computing subnode in the $N^{th}$ round of iteration of the task; and the computing resource usage includes: at least one of a CPU usage or a memory usage.

With reference to the fifth possible implementation manner of the first aspect, in a sixth possible implementation manner, the first determining unit is specifically configured to:

determine, among all the computing subnodes in the $N^{th}$ round of iteration of the task, a computing subnode with a longest actual execution time and a computing subnode with a shortest actual execution time;

obtain an actual-execution-time difference proportion between the computing subnode with the longest actual execution time and the computing subnode with the shortest actual execution time; and compare the time difference proportion with a preset difference proportion threshold; and if the time difference proportion is less than or equal to the preset difference proportion threshold, determine that load balancing does not need to be performed in the $(N+1)^{th}$ round of iteration of the task; or if the time difference proportion is greater than the preset difference proportion threshold, determine that load balancing needs to be performed in the $(N+1)^{th}$ round of iteration of the task.

With reference to any one of the first aspect to the sixth possible implementation manner of the first aspect, in a seventh possible implementation manner, the central node further includes a second determining unit, which is specifically configured to:

after each computing subnode completes the $N^{th}$ round of iteration of the task, determine whether N is equal to a preset maximum iteration quantity; and if N is less than the maximum iteration quantity, determine that the task has not ended; or if N is equal to the maximum iteration quantity, determine that the task ends; or after each computing subnode completes the $N^{th}$ round of iteration of the task, determine whether an output result of the $N^{th}$ round of iteration meets a convergence condition; and if the convergence condition is not met, determine that the task has not ended; or if the convergence condition is met, determine that the task ends.

According to a second aspect, an embodiment of the present invention provides another central node, applied to a data mining system, where the central node includes:

a time obtaining unit, configured to obtain predicted execution time of each computing subnode in the $N^{th}$ round of iteration of a task according to a time learning model;

a first determining unit, configured to determine, according to the predicted execution time of each computing subnode, whether load balancing needs to be performed in the $N^{th}$ round of iteration of the task;

an allocation unit, configured to: when load balancing needs to be performed, reallocate task data to each computing subnode according to the predicted execution time of each computing subnode, where when load balancing does not need to be performed, no task data is reallocated to each computing subnode, and the task data is a part or all of data in an obtained to-be-mined sample data set;

an information obtaining unit, configured to: after each computing subnode completes the $N^{th}$ round of iteration of the task according to the allocated task data, obtain execution status information of each computing subnode in the $N^{th}$ round of iteration of the task; and an update unit, configured to update a training parameter of the time learning model according to the execution status information of each computing subnode; if the execution of the task has not completed, increase a value of N by 1, and repeat the step of obtaining predicted execution time of each computing subnode in the $N^{th}$ round of iteration of the task according to a time learning model to the step of updating a training parameter of the time learning model according to the execution status information of each computing subnode are repeated by using an updated time learning model.

With reference to the second aspect, in a first possible implementation manner, the time learning model is established according to at least one parameter of actual execution time, a computing resource usage, or a historical task data volume.

With reference to the first possible implementation manner of the second aspect, in a second possible implementation manner, the time learning model includes:

Predicted execution time of a computing subnode i in the $N^{th}$ round of iteration of the task=a*Actual execution time of the computing subnode i in the $(N-1)^{th}$ round of iteration of the task+b*Computing resource usage of the computing subnode i in the $(N-1)^{th}$ round of iteration of the task+c*Historical task data volume of the computing subnode i in the $(N-1)^{th}$ round of iteration of the task+C, where a is an execution time training parameter, b is a computing resource usage training parameter, c is a historical task volume training parameter, C is a training constant, and i is a positive integer; the computing resource usage includes at least one of a CPU usage or a memory usage; and the historical task data volume of the computing subnode i in the $(N-1)^{th}$ round of iteration of the task is a volume of task data allocated to the computing subnode i in the $(N-1)^{th}$ round of iteration of the task.

With reference to any one of the second aspect to the second possible implementation manner of the second aspect, in a third possible implementation manner, the first determining unit is specifically configured to:

determine, among all the computing subnodes in the $N^{th}$ round of iteration of the task, a computing subnode with a longest predicted execution time and a computing subnode with a shortest predicted execution time;

obtain a predicted-execution-time difference proportion between the computing subnode with the longest predicted execution time and the computing subnode with the shortest predicted execution time; and compare the time difference proportion with a preset difference proportion threshold; and if the time difference proportion is less than or equal to the preset difference proportion threshold, determine that load balancing does not need to be performed in the $N^{th}$ round of iteration of the task; or if the time difference proportion is greater than the preset difference proportion threshold, determine that load balancing needs to be performed in the $N^{th}$ round of iteration of the task.

With reference to any one of the second aspect to the third possible implementation manner of the second aspect, in a fourth possible implementation manner, the allocation unit includes:

a node selection unit, configured to determine a computing subnode whose predicted execution time is greater than standard execution time as an overloaded node, and determine a computing subnode whose predicted execution time is less than the standard execution time as an idle node;

a unit for determining a to-be-transferred task volume, configured to obtain a proportion of tasks to be transferred from each overloaded node according to predicted execution time of each overloaded node and the standard execution time, and obtain, according to the proportion of tasks to be transferred from each overloaded node, a volume of task data that needs to be transferred from each overloaded node;

a unit for determining a to-be-received task volume, configured to obtain a proportion of tasks to be received by each idle node according to predicted execution time of each idle node and the standard execution time, and obtain, according to the proportion of tasks to be received by each idle node, a volume of task data that can be received by each idle node; and a transfer unit, configured to sequentially transfer out, according to a volume, corresponding to the overloaded node, of task data that needs to be transferred, task data of each overloaded node in a descending order of predicted execution time of overloaded nodes, and sequentially transfer the task data into at least one idle node, which is sequenced in an ascending order of predicted execution time of idle nodes, according to the volume of task data that can be received by each idle node, until all task data that needs to be transferred from the overloaded nodes is transferred completely.

With reference to the fourth possible implementation manner of the second aspect, in a fifth possible implementation manner, the unit for determining a to-be-transferred task volume is specifically configured to:

divide a difference between the predicted execution time of each overloaded node and the standard execution time by the standard execution time, to obtain the proportion of tasks to be transferred from the overloaded node; and multiply a task data volume of task data stored on each overloaded node by the proportion of tasks to be transferred from the overloaded node, to obtain the volume of task data that needs to be transferred from the overloaded node; and the unit for determining a to-be-received task volume is specifically configured to:

divide an absolute value of a difference between the predicted execution time of each idle node and the standard execution time by the standard execution time, to obtain the proportion of tasks to be received by the idle node; and multiply a task data volume of task data stored on each idle node by the proportion of tasks to be received by the idle node, to obtain the volume of task data that can be received by the idle node.

With reference to any one of the second aspect to the fifth possible implementation manner of the second aspect, in a sixth possible implementation manner, the execution status information of each computing subnode in the $N^{th}$ round of iteration of the task includes: at least one of actual execution time, a computing resource usage, or a task data volume of each computing subnode in the $N^{th}$ round of iteration of the task; and the computing resource usage includes: at least one of a CPU usage or a memory usage.

With reference to the first possible implementation manner of the second aspect, in a seventh possible implementation manner, the update unit is specifically configured to:

update at least one parameter of the execution time training parameter, the computing resource usage training parameter, or the historical task data volume training parameter of the time learning model according to the execution status information of each computing subnode.

With reference to any one of the second aspect to the seventh possible implementation manner of the second aspect, in an eighth possible implementation manner, the central node further includes a second determining unit, which is specifically configured to:

after each computing subnode completes the $N^{th}$ round of iteration of the task, determine whether N is equal to a preset maximum iteration quantity; and if N is less than the maximum iteration quantity, determine that the task has not ended; or if N is equal to the maximum iteration quantity, determine that the task ends; or after each computing subnode completes the $N^{th}$ round of iteration of the task, determine whether an output result of the $N^{th}$ round of iteration meets a convergence condition; and if the convergence condition is not met, determine that the task has not ended; or if the convergence condition is met, determine that the task ends.

According to a third aspect, a data mining system is provided, where the system includes:

the central node according to any one of the first aspect to the eighth possible implementation manner of the second aspect, and at least two computing subnodes.

According to a fourth aspect, a data mining method is provided, where the method includes:

obtaining predicted execution time of each computing subnode in the $N^{th}$ round of iteration of a task;

reallocating task data to each computing subnode according to the predicted execution time of each computing subnode, where the task data is a part or all of data in an obtained to-be-mined sample data set;

after each computing subnode completes the $N^{th}$ round of iteration of the task according to the allocated task data, if the task has not ended, obtaining execution status information of each computing subnode in the $N^{th}$ round of iteration of the task; and determining, according to the execution status information of each computing subnode, whether load balancing needs to be performed in the $(N+1)^{th}$ round of iteration of the task, where if load balancing needs to be performed, after 1 is added to a value of N, the step of obtaining predicted execution time of each computing subnode in the $N^{th}$ round of iteration of the task to the step of determining, according to the execution status information of each computing subnode, whether load balancing needs to be performed in the $(N+1)^{th}$ round of iteration of the task are repeated; and if load balancing does not need to be performed, each computing subnode executes the $(N+1)^{th}$ round of iteration of the task according to the task data that is allocated to the computing subnode in the $N^{th}$ round of iteration of the task, where N is a positive integer, and a start value of N is 1.

With reference to the fourth aspect, in a first possible implementation manner, when N is equal to 1, the obtaining predicted execution time of each computing subnode in the $N^{th}$ round of iteration of the task includes:

obtaining the predicted execution time of each computing subnode according to a distribution characteristic parameter of the sample data set and a computing resource of each computing subnode, where the distribution characteristic parameter of the sample data set includes: an average value, a variance, a quantity of different values, and a value range that are of values, in a same field, of data in the sample data set; and the computing resource of each computing subnode includes: at least one of a CPU frequency or a memory capacity of the computing subnode.

With reference to the fourth aspect, in a second possible implementation manner, when N is greater than 1, the obtaining predicted execution time of each computing subnode in the $N^{th}$ round of iteration of the task includes:

using actual execution time at which each computing subnode executes the $(N-1)^{th}$ round of iteration of the task as the predicted execution time of the computing subnode in the $N^{th}$ round of iteration of the task.

With reference to any one of the fourth aspect to the second possible implementation manner of the fourth aspect, in a third possible implementation manner, the reallocating task data to each computing subnode according to the predicted execution time of each computing subnode includes:

determining a computing subnode whose predicted execution time is greater than standard execution time as an overloaded node, and determining a computing subnode whose predicted execution time is less than the standard execution time as an idle node;

obtaining a proportion of tasks to be transferred from each overloaded node according to predicted execution time of each overloaded node and the standard execution time, and obtaining, according to the proportion of tasks to be transferred from each overloaded node, a volume of task data that needs to be transferred from each overloaded node;

obtaining a proportion of tasks to be received by each idle node according to predicted execution time of each idle node and the standard execution time, and obtaining, according to the proportion of tasks to be received by each idle node, a volume of task data that can be received by each idle node; and sequentially transferring out, according to a volume, corresponding to the overloaded node, of task data that needs to be transferred, task data of each overloaded node in a descending order of predicted execution time of overloaded nodes, and sequentially transferring the task data into at least one idle node, which is sequenced in an ascending order of predicted execution time of idle nodes, according to the volume of task data that can be received by each idle node, until all task data that needs to be transferred from the overloaded nodes is transferred completely.

With reference to the third possible implementation manner of the fourth aspect, in a fourth possible implementation manner, the obtaining a proportion of tasks to be transferred from each overloaded node according to predicted execution time of each overloaded node and the standard execution time, and obtaining, according to the proportion of tasks to be transferred from each overloaded node, a volume of task data that needs to be transferred from each overloaded node includes:

dividing a difference between the predicted execution time of each overloaded node and the standard execution time by the standard execution time, to obtain the proportion of tasks to be transferred from the overloaded node; and multiplying a task data volume of task data stored on each overloaded node by the proportion of tasks to be transferred from the overloaded node, to obtain the volume of task data that needs to be transferred from the overloaded node; and the obtaining a proportion of tasks to be received by each idle node according to predicted execution time of each idle node and the standard execution time, and obtaining, according to the proportion of tasks to be received by each idle node, a volume of task data that can be received by each idle node includes:

dividing an absolute value of a difference between the predicted execution time of each idle node and the standard execution time by the standard execution time, to obtain the proportion of tasks to be received by the idle node; and multiplying a task data volume of task data stored on each idle node by the proportion of tasks to be received by the idle node, to obtain the volume of task data that can be received by the idle node.

With reference to any one of the fourth aspect to the fourth possible implementation manner of the fourth aspect, in a fifth possible implementation manner, the execution status information of each computing subnode in the $N^{th}$ round of iteration of the task includes: at least one of actual execution time, a computing resource usage, or a task data volume of each computing subnode in the $N^{th}$ round of iteration of the task; and the computing resource usage includes: at least one of a CPU usage or a memory usage.

With reference to the fifth possible implementation manner of the fourth aspect, in a sixth possible implementation manner, the determining, according to the execution status information of each computing subnode, whether load balancing needs to be performed in the $(N+1)^{th}$ round of iteration of the task includes:

determining, among all the computing subnodes in the $N^{th}$ round of iteration of the task, a computing subnode with a longest actual execution time and a computing subnode with a shortest actual execution time;

obtaining an actual-execution-time difference proportion between the computing subnode with the longest actual execution time and the computing subnode with the shortest actual execution time; and comparing the time difference proportion with a preset difference proportion threshold; and if the time difference proportion is less than or equal to the preset difference proportion threshold, determining that load balancing does not need to be performed in the $(N+1)^{th}$ round of iteration of the task; or if the time difference proportion is greater than the preset difference proportion threshold, determining that load balancing needs to be performed in the $(N+1)^{th}$ round of iteration of the task.

With reference to any one of the fourth aspect to the sixth possible implementation manner of the fourth aspect, in a seventh possible implementation manner, a method for determining whether the task ends includes:

after each computing subnode completes the $N^{th}$ round of iteration of the task, determining whether N is equal to a preset maximum iteration quantity; and if N is less than the maximum iteration quantity, determining that the task has not ended; or if N is equal to the maximum iteration quantity, determining that the task ends; or after each computing subnode completes the $N^{th}$ round of iteration of the task, determining whether an output result of the $N^{th}$ round of iteration meets a convergence condition; and if the convergence condition is not met, determining that the task has not ended; or if the convergence condition is met, determining that the task ends.

According to a fifth aspect, a data mining method is provided, where the method includes:

obtaining predicted execution time of each computing subnode in the $N^{th}$ round of iteration of a task according to a time learning model;

determining, according to the predicted execution time of each computing subnode, whether load balancing needs to be performed in the $N^{th}$ round of iteration of the task;

when load balancing needs to be performed, reallocating task data to each computing subnode according to the predicted execution time of each computing subnode, where when load balancing does not need to be performed, no task data is reallocated to each computing subnode, and the task data is a part or all of data in an obtained to-be-mined sample data set;

after each computing subnode completes the $N^{th}$ round of iteration of the task according to the allocated task data, obtaining execution status information of each computing subnode in the $N^{th}$ round of iteration of the task; and updating a training parameter of the time learning model according to the execution status information of each computing subnode; if the execution of the task has not completed, increasing a value of N by 1, and repeating the step of obtaining predicted execution time of each computing subnode in the $N^{th}$ round of iteration of the task according to a time learning model to the step of updating a training parameter of the time learning model according to the execution status information of each computing subnode are repeated by using an updated time learning model, N is a positive integer, and a start value of N is 1.

With reference to the fifth aspect, in a first possible implementation manner, the time learning model is established according to at least one parameter of actual execution time, a computing resource usage, or a historical task data volume.

With reference to the first possible implementation manner of the fifth aspect, in a second possible implementation manner, the time learning model includes:

Predicted execution time of a computing subnode i in the $N^{th}$ round of iteration of the task=a*Actual execution time of the computing subnode i in the $(N-1)^{th}$ round of iteration of the task+b*Computing resource usage of the computing subnode i in the $(N-1)^{th}$ round of iteration of the task+ c*Historical task data volume of the computing subnode i in the $(N-1)^{th}$ round of iteration of the task+C, where a is an execution time training parameter, b is a computing resource usage training parameter, c is a historical task volume training parameter, C is a training constant, and i is a positive integer; the computing resource usage includes at least one of a CPU usage or a memory usage; and the historical task data volume of the computing subnode i in the $(N-1)^{th}$ round of iteration of the task is a volume of task data allocated to the computing subnode i in the $(N-1)^{th}$ round of iteration of the task.

With reference to any one of the fifth aspect to the second possible implementation manner of the fifth aspect, in a third possible implementation manner, the determining, according to the predicted execution time of each computing subnode, whether load balancing needs to be performed in the $N^{th}$ round of iteration of the task includes:

determining, among all the computing subnodes in the $N^{th}$ round of iteration of the task, a computing subnode with a longest predicted execution time and a computing subnode with a shortest predicted execution time;

obtaining a predicted-execution-time difference proportion between the computing subnode with the longest predicted execution time and the computing subnode with the shortest predicted execution time; and comparing the time difference proportion with a preset difference proportion threshold; and if the time difference proportion is less than or equal to the preset difference proportion threshold, determining that load balancing does not need to be performed in the $N^{th}$ round of iteration of the task; or if the time difference proportion is greater than the preset difference proportion threshold, determining that load balancing needs to be performed in the $N^{th}$ round of iteration of the task.

With reference to any one of the fifth aspect to the third possible implementation manner of the fifth aspect, in a fourth possible implementation manner, the reallocating task data to each computing subnode according to the predicted execution time of each computing subnode includes:

determining a computing subnode whose predicted execution time is greater than standard execution time as an overloaded node, and determining a computing subnode whose predicted execution time is less than the standard execution time as an idle node;

obtaining a proportion of tasks to be transferred from each overloaded node according to predicted execution time of each overloaded node and the standard execution time, and obtaining, according to the proportion of tasks to be transferred from each overloaded node, a volume of task data that needs to be transferred from each overloaded node;

obtaining a proportion of tasks to be received by each idle node according to predicted execution time of each idle node and the standard execution time, and obtaining, according to the proportion of tasks to be received by each idle node, a volume of task data that can be received by each idle node; and sequentially transferring out, according to a volume, corresponding to the overloaded node, of task data that needs to be transferred, task data of each overloaded node in a descending order of predicted execution time of overloaded nodes, and sequentially transferring the task data into at least one idle node, which is sequenced in an ascending order of predicted execution time of idle nodes, according to the volume of task data that can be received by each idle node, until all task data that needs to be transferred from the overloaded nodes is transferred completely.

With reference to the fourth possible implementation manner of the fifth aspect, in a fifth possible implementation manner, the obtaining a proportion of tasks to be transferred from each overloaded node according to predicted execution time of each overloaded node and the standard execution time, and obtaining, according to the proportion of tasks to be transferred from each overloaded node, a volume of task data that needs to be transferred from each overloaded node includes:

dividing a difference between the predicted execution time of each overloaded node and the standard execution time by the standard execution time, to obtain the proportion of tasks to be transferred from the overloaded node; and multiplying a task data volume of task data stored on each overloaded node by the proportion of tasks to be transferred from the overloaded node, to obtain the volume of task data that needs to be transferred from the overloaded node; and the obtaining a proportion of tasks to be received by each idle node according to predicted execution time of each idle node and the standard execution time, and obtaining, according to the proportion of tasks to be received by each idle node, a volume of task data that can be received by each idle node includes:

dividing an absolute value of a difference between the predicted execution time of each idle node and the standard execution time by the standard execution time, to obtain the proportion of tasks to be received by the idle node; and multiplying a task data volume of task data stored on each idle node by the proportion of tasks to be received by the idle node, to obtain the volume of task data that can be received by the idle node.

With reference to any one of the fifth aspect to the fifth possible implementation manner of the fifth aspect, in a sixth possible implementation manner, the execution status information of each computing subnode in the $N^{th}$ round of iteration of the task includes: at least one of actual execution time, a computing resource usage, or a task data volume of each computing subnode in the $N^{th}$ round of iteration of the task; and the computing resource usage includes: at least one of a CPU usage or a memory usage.

With reference to the second possible implementation manner of the fifth aspect, in a seventh possible implementation manner, the updating a training parameter of the time learning model according to the execution status information of each computing subnode includes:

updating at least one parameter of the execution time training parameter, the computing resource usage training parameter, or the historical task data volume training parameter of the time learning model according to the execution status information of each computing subnode.

With reference to any one of the fifth aspect to the seventh possible implementation manner of the fifth aspect, in an eighth possible implementation manner, a method for determining whether the task ends includes:

after each computing subnode completes the $N^{th}$ round of iteration of the task, determining whether N is equal to a preset maximum iteration quantity; and if N is less than the maximum iteration quantity, determining that the task has not ended; or if N is equal to the maximum iteration quantity, determining that the task ends; or after each computing subnode completes the $N^{th}$ round of iteration of the task, determining whether an output result of the $N^{th}$ round of iteration meets a convergence condition; and if the convergence condition is not met, determining that the task has not ended; or if the convergence condition is met, determining that the task ends.

Embodiments of the present invention provide a data mining method and a node. Predicted execution time of each computing subnode in a current round of iteration of a task is obtained, and a corresponding volume of task data is allocated to the computing subnode according to the predicted execution time. After the current round of iteration of the task is executed, execution status information of each computing subnode in the current round of iteration of the task is collected, and whether the task data volume of each computing subnode needs to be adjusted in a next round of iteration of the task is determined accordingly. The next round of iteration of the task is performed according to the adjusted task data volume. Alternatively, predicted execution time of each computing subnode in a current round of iteration of a task is obtained according to a time learning model, and whether load balancing needs to be performed in the current round of iteration of the task is determined according to the predicted execution time. If load balancing needs to be performed, a volume of task data allocated to each computing subnode is adjusted. After the current round of iteration of the task is executed, execution status information of each computing subnode in the current round of iteration of the task is collected, and a training parameter of the time learning model is updated accordingly. The foregoing process is repeated in a next round of iteration. Compared with the prior art in which load balancing is executed in each round of iteration of the task process, in the embodiments of the present invention, a corresponding volume of task data can be allocated according to a capability of each computing subnode, and a task data volume of each computing subnode in a current round of task can be adjusted according to an execution status in a previous round. In this way, some unnecessary load balancing processes can be avoided, network consumption can be reduced, and data mining performance of a system can be improved.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
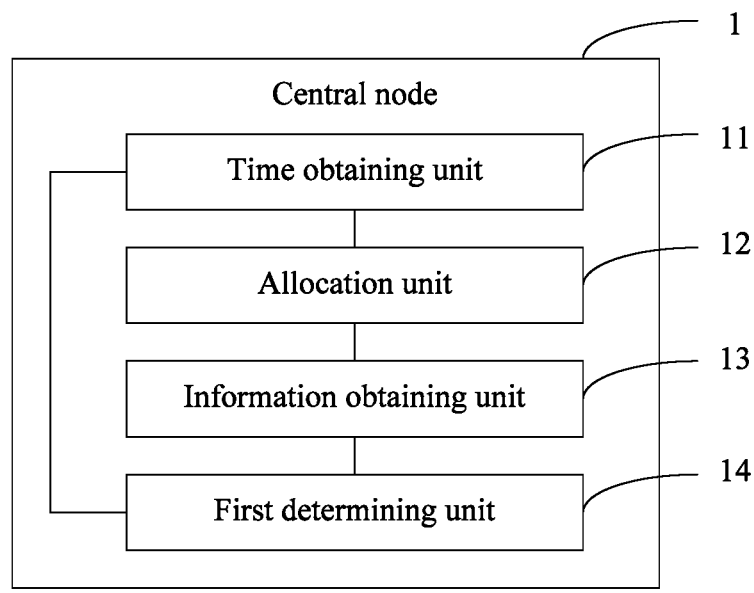
FIG. 1 is a schematic structural diagram of a central node according to an embodiment of the present invention.

An embodiment of the present invention provides a central node 1, which may be applied to a data mining system. As shown in FIG. 1, the central node 1 includes:

a time obtaining unit 11, configured to obtain predicted execution time of each computing subnode in the $N^{th}$ round of iterative task;

an allocation unit 12, configured to reallocate task data for each computing subnode according to the predicted execution time of each computing subnode, where the task data is a part or all of data in an obtained to-be-mined sample data set;

an information obtaining unit 13, configured to: after each computing subnode completes the $N^{th}$ round of iterative task according to the allocated task data, if an iterative task has not ended, obtain execution status information of each computing subnode in the $N^{th}$ round of iterative task; and a first determining unit 14, configured to: determine, according to the execution status information of each computing subnode, whether load balancing needs to be performed in the $(N+1)^{th}$ round of iterative task, where if load balancing needs to be performed, after 1 is added to a value of N, the step of obtaining predicted execution time of each computing subnode in the $N^{th}$ round of iterative task to the step of determining, according to the execution status information of each computing subnode, whether load balancing needs to be performed in the $(N+1)^{th}$ round of iterative task are repeated; and if load balancing does not need to be performed, each computing subnode executes the $(N+1)^{th}$ round of iterative task according to the task data that is allocated to the computing subnode in the $N^{th}$ round of iterative task, where N is a positive integer, and a start value of N is 1.

Optionally, when N is equal to 1, the time obtaining unit 11 may be specifically configured to:

obtain the predicted execution time of each computing subnode according to a distribution characteristic parameter of the sample data set and a computing resource of each computing subnode, where the distribution characteristic parameter of the sample data set includes: an average value, a variance, a quantity of different values, and a value range that are of values, in a same field, of data in the sample data set; and the computing resource of each computing subnode includes: at least one of a CPU frequency or a memory capacity of the computing subnode.

Optionally, when N is greater than 1, the time obtaining unit 11 may be specifically configured to:

use actual execution time at which each computing subnode executes the $(N-1)^{th}$ round of iterative task as the predicted execution time of the computing subnode in the $N^{th}$ round of iterative task.

Figure 2:
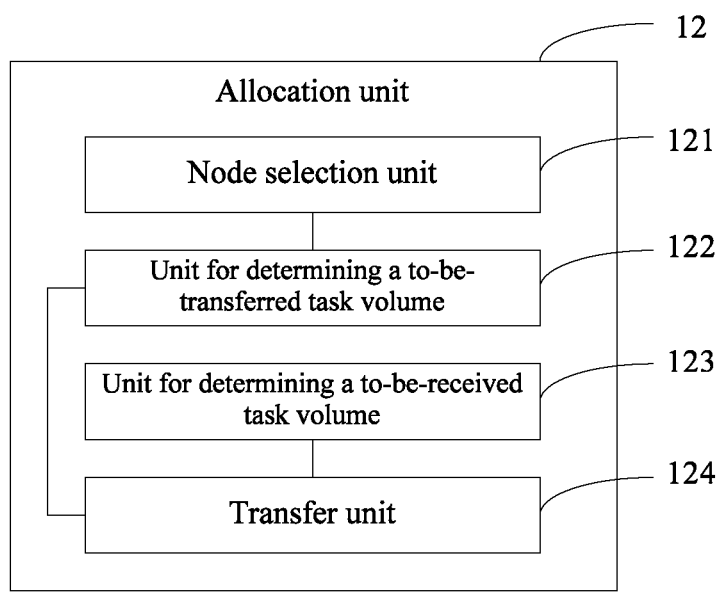
FIG. 2 is a schematic structural diagram of an allocation unit of a central node according to an embodiment of the present invention.

Optionally, as shown in FIG. 2, the allocation unit 12 may include:

a node selection unit 121, configured to determine a computing subnode whose predicted execution time is greater than standard execution time as an overloaded node, and determine a computing subnode whose predicted execution time is less than the standard execution time as an idle node;

a unit 122 for determining a to-be-transferred task volume, configured to obtain a proportion of tasks to be transferred from each overloaded node according to predicted execution time of each overloaded node and the standard execution time, and obtain, according to the proportion of tasks to be transferred from each overloaded node, a volume of task data that needs to be transferred from each overloaded node;

a unit 123 for determining a to-be-received task volume, configured to obtain a proportion of tasks to be received by each idle node according to predicted execution time of each idle node and the standard execution time, and obtain, according to the proportion of tasks to be received by each idle node, a volume of task data that can be received by each idle node; and a transfer unit 124, configured to sequentially transfer out, according to a volume, corresponding to the overloaded node, of task data that needs to be transferred, task data of each overloaded node in a descending order of predicted execution time of overloaded nodes, and sequentially transfer the task data into at least one idle node, which is sequenced in an ascending order of predicted execution time of idle nodes, according to the volume of task data that can be received by each idle node, until all task data that needs to be transferred from the overloaded nodes is transferred completely.

Optionally, the unit 122 for determining a to-be-transferred task volume may be specifically configured to:

divide a difference between the predicted execution time of each overloaded node and the standard execution time by the standard execution time, to obtain the proportion of tasks to be transferred from the overloaded node; and multiply a task data volume of task data stored on each overloaded node by the proportion of tasks to be transferred from the overloaded node, to obtain the volume of task data that needs to be transferred from the overloaded node; and the unit 123 for determining a to-be-received task volume may be specifically configured to:

divide an absolute value of a difference between the predicted execution time of each idle node and the standard execution time by the standard execution time, to obtain the proportion of tasks to be received by the idle node; and multiply a task data volume of task data stored on each idle node by the proportion of tasks to be received by the idle node, to obtain the volume of task data that can be received by the idle node.

Optionally, the execution status information of each computing subnode in the $N^{th}$ round of iterative task includes: at least one of actual execution time, a computing resource usage, or a task data volume of each computing subnode in the $N^{th}$ round of iterative task; and the computing resource usage includes: at least one of a CPU usage or a memory usage.

Optionally, the first determining unit 14 may be specifically configured to:

determine, among all the computing subnodes in the $N^{th}$ round of iterative task, a computing subnode with a longest actual execution time and a computing subnode with a shortest actual execution time;

obtain an actual-execution-time difference proportion between the computing subnode with the longest actual execution time and the computing subnode with the shortest actual execution time; and compare the time difference proportion with a preset difference proportion threshold; and if the time difference proportion is less than or equal to the preset difference proportion threshold, determine that load balancing does not need to be performed in the $(N+1)^{th}$ round of iterative task; or if the time difference proportion is greater than the preset difference proportion threshold, determine that load balancing needs to be performed in the $(N+1)^{th}$ round of iterative task.

Figure 3:
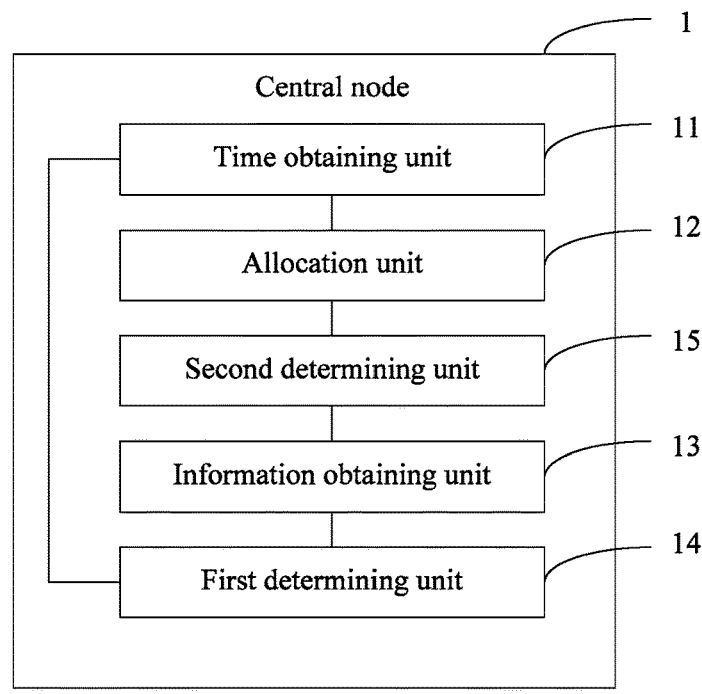
FIG. 3 is another schematic structural diagram of a central node according to an embodiment of the present invention.

Optionally, as shown in FIG. 3, the central node 1 may further include a second determining unit 15, which may be specifically configured to:

after each computing subnode completes the $N^{th}$ round of iterative task, determine whether N is equal to a preset maximum iteration quantity; and if N is less than the maximum iteration quantity, determine that the iterative task has not ended; or if N is equal to the maximum iteration quantity, determine that the iterative task ends; or after each computing subnode completes the $N^{th}$ round of iterative task, determine whether an output result of the $N^{th}$ round of iteration meets a convergence condition; and if the convergence condition is not met, determine that the iterative task has not ended; or if the convergence condition is met, determine that the iterative task ends.

This embodiment of the present invention provides a central node. Predicted execution time of each computing subnode in a current round of iterative task is obtained, and a corresponding volume of task data is allocated to the computing subnode according to the predicted execution time; after the current round of iterative task is executed, execution status information of each computing subnode in the current round of iterative task is collected, and whether the task data volume of each computing subnode needs to be adjusted in a next round of iterative task is determined accordingly. Compared with the prior art in which load balancing is executed in each round of iterative task process, in this embodiment of the present invention, a corresponding volume of task data can be allocated according to a capability of each computing subnode, and a task data volume of each computing subnode in a current round of task can be adjusted according to an execution status in a previous round. In this way, some unnecessary load balancing processes can be avoided, network consumption can be reduced, and data mining performance of a system can be improved.

Figure 4:
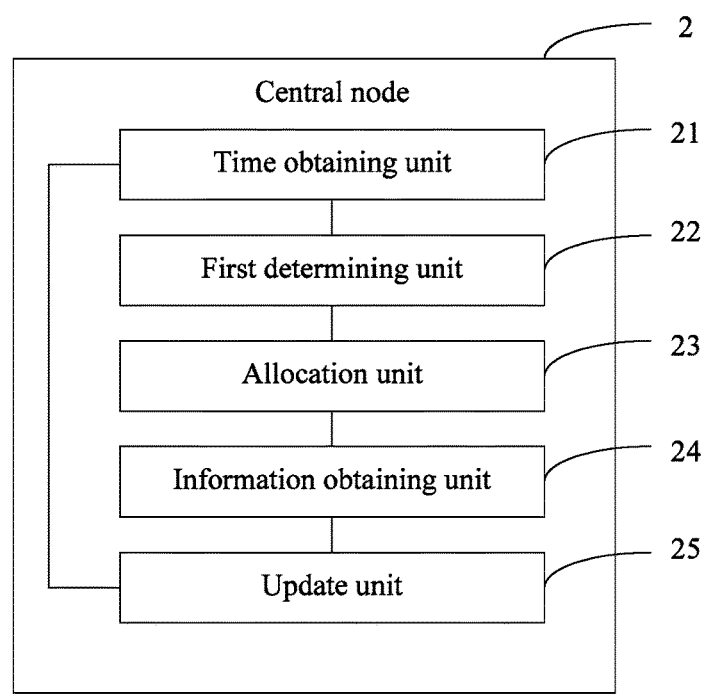
FIG. 4 is a schematic structural diagram of another central node according to an embodiment of the present invention.

An embodiment of the present invention provides another central node 2, which may be applied to a data mining system. As shown in FIG. 4, the central node 2 includes:

a time obtaining unit 21, configured to obtain predicted execution time of each computing subnode in the $N^{th}$ round of iterative task according to a time learning model;

a first determining unit 22, configured to determine, according to the predicted execution time of each computing subnode, whether load balancing needs to be performed in the $N^{th}$ round of iterative task;

an allocation unit 23, configured to: when load balancing needs to be performed, reallocate task data to each computing subnode according to the predicted execution time of each computing subnode, where when load balancing does not need to be performed, no task data is reallocated to each computing subnode, and the task data is a part or all of data in an obtained to-be-mined sample data set;

an information obtaining unit 24, configured to: after each computing subnode completes the $N^{th}$ round of iterative task according to the allocated task data, obtain execution status information of each computing subnode in the $N^{th}$ round of iterative task; and an update unit 25, configured to update a training parameter of the time learning model according to the execution status information of each computing subnode; if the execution of the iterative task has not completed, increase a value of N by 1, and repeat the step of obtaining predicted execution time of each computing subnode in the $N^{th}$ round of iterative task according to a time learning model to the step of updating a training parameter of the time learning model according to the execution status information of each computing subnode are repeated by using an updated time learning model.

Optionally, the time learning model may be established according to at least one parameter of actual execution time, a computing resource usage, or a historical task data volume.

Optionally, the time learning model may include:

Predicted execution time of a computing subnode i in the $N^{th}$ round of iterative task=a*Actual execution time of the computing subnode i in the $(N-1)^{th}$ round of iterative task+b*Computing resource usage of the computing subnode i in the $(N-1)^{th}$ round of iterative task+c*Historical task data volume of the computing subnode i in the $(N-1)^{th}$ round of iterative task+C, where a is an execution time training parameter, b is a computing resource usage training parameter, c is a historical task volume training parameter, C is a training constant, and i is a positive integer; the computing resource usage includes at least one of a CPU usage or a memory usage; and the historical task data volume of the computing subnode i in the $(N-1)^{th}$ round of iterative task is a volume of task data allocated to the computing subnode i in the $(N-1)^{th}$ round of iterative task.

Optionally, the first determining unit 22 may be specifically configured to:

determine, among all the computing subnodes in the $N^{th}$ round of iterative task, a computing subnode with a longest predicted execution time and a computing subnode with a shortest predicted execution time;

obtain a predicted-execution-time difference proportion between the computing subnode with the longest predicted execution time and the computing subnode with the shortest predicted execution time; and compare the time difference proportion with a preset difference proportion threshold; and if the time difference proportion is less than or equal to the preset difference proportion threshold, determine that load balancing does not need to be performed in the $N^{th}$ round of iterative task; or if the time difference proportion is greater than the preset difference proportion threshold, determine that load balancing needs to be performed in the $N^{th}$ round of iterative task.

Figure 5:
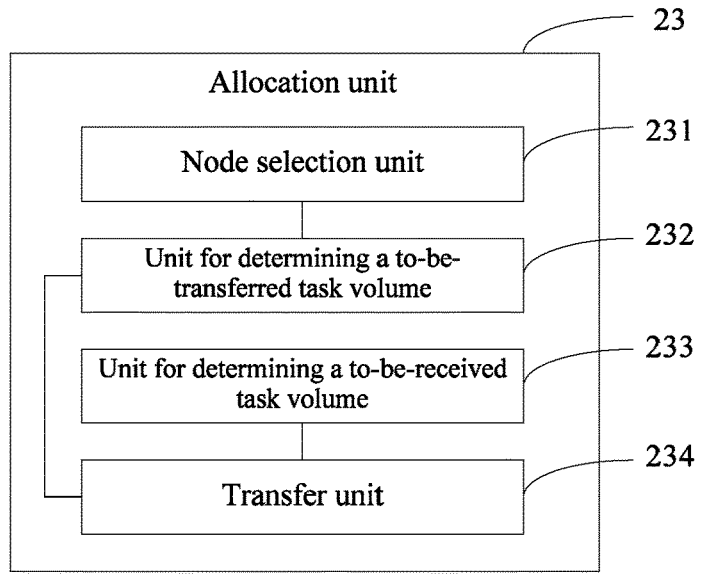
FIG. 5 is a schematic structural diagram of an allocation unit of another central node according to an embodiment of the present invention.

Optionally, as shown in FIG. 5, the allocation unit 23 may include:

a node selection unit 231, configured to determine a computing subnode whose predicted execution time is greater than standard execution time as an overloaded node, and determine a computing subnode whose predicted execution time is less than the standard execution time as an idle node;

a unit 232 for determining a to-be-transferred task volume, configured to obtain a proportion of tasks to be transferred from each overloaded node according to predicted execution time of each overloaded node and the standard execution time, and obtain, according to the proportion of tasks to be transferred from each overloaded node, a volume of task data that needs to be transferred from each overloaded node;

a unit 233 for determining a to-be-received task volume, configured to obtain a proportion of tasks to be received by each idle node according to predicted execution time of each idle node and the standard execution time, and obtain, according to the proportion of tasks to be received by each idle node, a volume of task data that can be received by each idle node; and a transfer unit 234, configured to sequentially transfer out, according to a volume, corresponding to the overloaded node, of task data that needs to be transferred, task data of each overloaded node in a descending order of predicted execution time of overloaded nodes, and sequentially transfer the task data into at least one idle node, which is sequenced in an ascending order of predicted execution time of idle nodes, according to the volume of task data that can be received by each idle node, until all task data that needs to be transferred from the overloaded nodes is transferred completely.

Optionally, the unit 232 for determining a to-be-transferred task volume may be specifically configured to:

divide a difference between the predicted execution time of each overloaded node and the standard execution time by the standard execution time, to obtain the proportion of tasks to be transferred from the overloaded node; and multiply a task data volume of task data stored on each overloaded node by the proportion of tasks to be transferred from the overloaded node, to obtain the volume of task data that needs to be transferred from the overloaded node; and the unit 233 for determining a to-be-received task volume may be specifically configured to:

divide an absolute value of a difference between the predicted execution time of each idle node and the standard execution time by the standard execution time, to obtain the proportion of tasks to be received by the idle node; and multiply a task data volume of task data stored on each idle node by the proportion of tasks to be received by the idle node, to obtain the volume of task data that can be received by the idle node.

Optionally, the execution status information of each computing subnode in the $N^{th}$ round of iterative task includes: at least one of actual execution time, a computing resource usage, or a task data volume of each computing subnode in the $N^{th}$ round of iterative task; and the computing resource usage includes: at least one of a CPU usage or a memory usage.

Optionally, the update unit 25 may be specifically configured to:

update at least one parameter of the execution time training parameter, the computing resource usage training parameter, or the historical task data volume training parameter of the time learning model according to the execution status information of each computing subnode.

Figure 6:
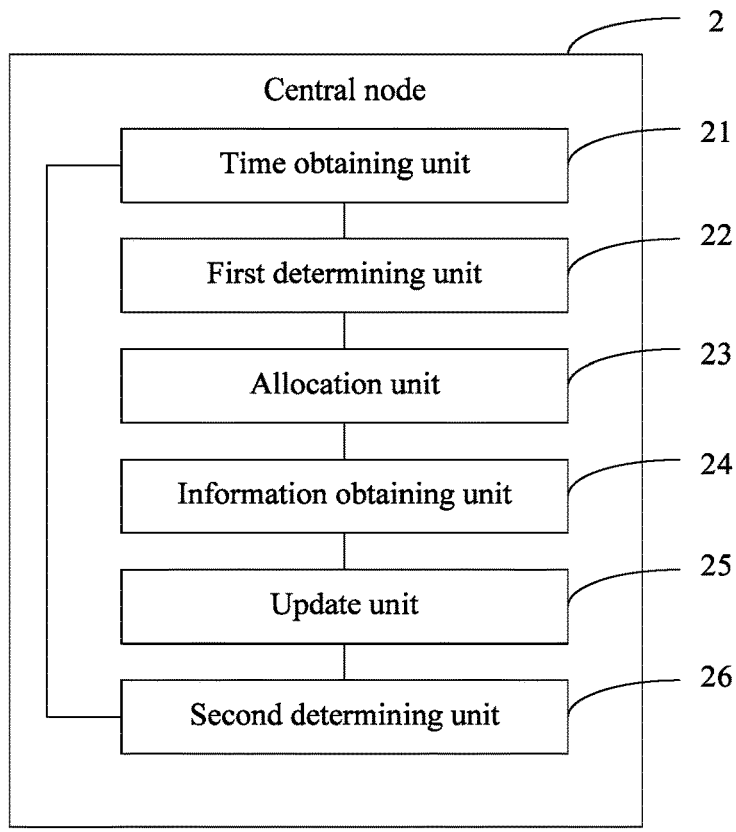
FIG. 6 is another schematic structural diagram of another central node according to an embodiment of the present invention.

Optionally, as shown in FIG. 6, the central node 2 may further include a second determining unit 26, which may be specifically configured to:

after each computing subnode completes the $N^{th}$ round of iterative task, determine whether N is equal to a preset maximum iteration quantity; and if N is less than the maximum iteration quantity, determine that the iterative task has not ended; or if N is equal to the maximum iteration quantity, determine that the iterative task ends; or after each computing subnode completes the $N^{th}$ round of iterative task, determine whether an output result of the $N^{th}$ round of iteration meets a convergence condition; and if the convergence condition is not met, determine that the iterative task has not ended; or if the convergence condition is met, determine that the iterative task ends.

This embodiment of the present invention provides a central node. Predicted execution time of each computing subnode in a current round of iterative task is obtained according to a time learning model, and whether load balancing needs to be performed in the current round of iterative task is determined according to the predicted execution time; if load balancing needs to be performed, a volume of task data allocated to each computing subnode is adjusted; after the current round of iterative task is executed, execution status information of each computing subnode in the current round of iterative task is collected, and a training parameter of the time learning model is updated accordingly; and the foregoing process is repeated in a next round of iteration. Compared with the prior art in which load balancing is executed in each round of iterative task process, in this embodiment of the present invention, a corresponding volume of task data can be allocated according to a capability of each computing subnode, and a task data volume of each computing subnode in a current round of task can be adjusted according to an execution status in a previous round. In this way, some unnecessary load balancing processes can be avoided, network consumption can be reduced, and data mining performance of a system can be improved.

Figure 7:
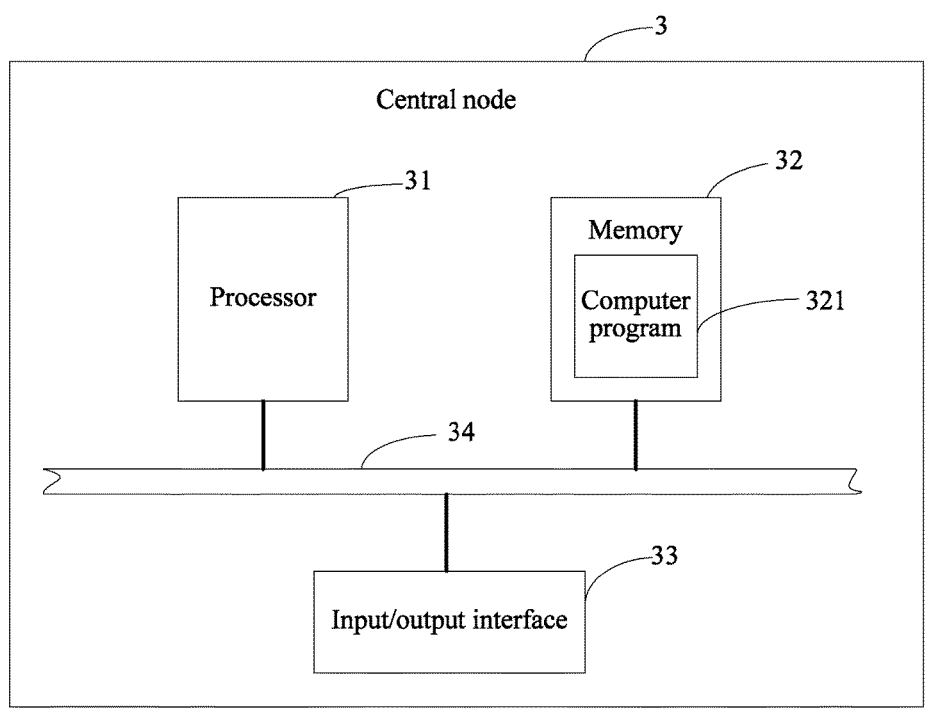
FIG. 7 is a schematic structural diagram of still another central node according to an embodiment of the present invention.

An embodiment of the present invention provides a central node 3, which may be applied to a data mining system. As shown in FIG. 7, the central node 3 includes: a processor 31, a memory 32, and an input/output interface 33. The processor 31, the memory 32, and the input/output interface 33 are connected by using a bus 34. The input/output interface 33 is configured to interact with another network element. The memory 32 is configured to store a computer program 321. The processor 31 is configured to execute the computer program 321, so as to:

obtain predicted execution time of each computing subnode in the $N^{th}$ round of iterative task;

reallocate task data to each computing subnode according to the predicted execution time of each computing subnode, where the task data is a part or all of data in an obtained to-be-mined sample data set;

after each computing subnode completes the $N^{th}$ round of iterative task according to the allocated task data, if an iterative task has not ended, obtain execution status information of each computing subnode in the $N^{th}$ round of iterative task; and determine, according to the execution status information of each computing subnode, whether load balancing needs to be performed in the $(N+1)^{th}$ round of iterative task, where if load balancing needs to be performed, after 1 is added to a value of N, the step of obtaining predicted execution time of each computing subnode in the $N^{th}$ round of iterative task to the step of determining, according to the execution status information of each computing subnode, whether load balancing needs to be performed in the $(N+1)^{th}$ round of iterative task are repeated; and if load balancing does not need to be performed, each computing subnode executes the $(N+1)^{th}$ round of iterative task according to the task data that is allocated to the computing subnode in the $N^{th}$ round of iterative task, where N is a positive integer, and a start value of N is 1.

Optionally, when N is equal to 1, the processor 31 may be specifically configured to execute the computer program 321 to:

obtain the predicted execution time of each computing subnode according to a distribution characteristic parameter of the sample data set and a computing resource of each computing subnode, where the distribution characteristic parameter of the sample data set includes: an average value, a variance, a quantity of different values, and a value range that are of values, in a same field, of data in the sample data set; and the computing resource of each computing subnode includes: at least one of a CPU frequency or a memory capacity of the computing subnode.

Optionally, when N is greater than 1, the processor 31 may be specifically configured to execute the computer program 321 to:

use actual execution time at which each computing subnode executes the $(N-1)^{th}$ round of iterative task as the predicted execution time of the computing subnode in the $N^{th}$ round of iterative task.

Optionally, the processor 31 may be specifically configured to execute the computer program 321 to:

determine a computing subnode whose predicted execution time is greater than standard execution time as an overloaded node, and determine a computing subnode whose predicted execution time is less than the standard execution time as an idle node;

obtain a proportion of tasks to be transferred from each overloaded node according to predicted execution time of each overloaded node and the standard execution time, and obtain, according to the proportion of tasks to be transferred from each overloaded node, a volume of task data that needs to be transferred from each overloaded node;

obtain a proportion of tasks to be received by each idle node according to predicted execution time of each idle node and the standard execution time, and obtain, according to the proportion of tasks to be received by each idle node, a volume of task data that can be received by each idle node; and sequentially transfer out, according to a volume, corresponding to the overloaded node, of task data that needs to be transferred, task data of each overloaded node in a descending order of predicted execution time of overloaded nodes, and sequentially transfer the task data into at least one idle node, which is sequenced in an ascending order of predicted execution time of idle nodes, according to the volume of task data that can be received by each idle node, until all task data that needs to be transferred from the overloaded nodes is transferred completely.

Optionally, the processor 31 may be configured to execute the computer program 321 to:

divide a difference between the predicted execution time of each overloaded node and the standard execution time by the standard execution time, to obtain the proportion of tasks to be transferred from the overloaded node; and multiply a task data volume of task data stored on each overloaded node by the proportion of tasks to be transferred from the overloaded node, to obtain the volume of task data that needs to be transferred from the overloaded node; and the processor 31 may be configured to execute the computer program 321 to:

divide an absolute value of a difference between the predicted execution time of each idle node and the standard execution time by the standard execution time, to obtain the proportion of tasks to be received by the idle node; and multiply a task data volume of task data stored on each idle node by the proportion of tasks to be received by the idle node, to obtain the volume of task data that can be received by the idle node.

Optionally, the execution status information of each computing subnode in the $N^{th}$ round of iterative task includes: at least one of actual execution time, a computing resource usage, or a task data volume of each computing subnode in the $N^{th}$ round of iterative task; and the computing resource usage includes: at least one of a CPU usage or a memory usage.

Optionally, the processor 31 may be specifically configured to execute the computer program 321 to:

determine, among all the computing subnodes in the $N^{th}$ round of iterative task, a computing subnode with a longest actual execution time and a computing subnode with a shortest actual execution time;

obtain an actual-execution-time difference proportion between the computing subnode with the longest actual execution time and the computing subnode with the shortest actual execution time; and compare the time difference proportion with a preset difference proportion threshold; and if the time difference proportion is less than or equal to the preset difference proportion threshold, determine that load balancing does not need to be performed in the $(N+1)^{th}$ round of iterative task; or if the time difference proportion is greater than the preset difference proportion threshold, determine that load balancing needs to be performed in the $(N+1)^{th}$ round of iterative task.

Optionally, the processor 31 may be further specifically configured to execute the computer program 321 to:

after each computing subnode completes the $N^{th}$ round of iterative task, determine whether N is equal to a preset maximum iteration quantity; and if N is less than the maximum iteration quantity, determine that the iterative task has not ended; or if N is equal to the maximum iteration quantity, determine that the iterative task ends; or after each computing subnode completes the $N^{th}$ round of iterative task, determine whether an output result of the $N^{th}$ round of iteration meets a convergence condition; and if the convergence condition is not met, determine that the iterative task has not ended; or if the convergence condition is met, determine that the iterative task ends.

This embodiment of the present invention provides a central node. Predicted execution time of each computing subnode in a current round of iterative task is obtained, and a corresponding volume of task data is allocated to the computing subnode according to the predicted execution time; after the current round of iterative task is executed, execution status information of each computing subnode in the current round of iterative task is collected, and whether the task data volume of each computing subnode needs to be adjusted in a next round of iterative task is determined accordingly. Compared with the prior art in which load balancing is executed in each round of iterative task process, in this embodiment of the present invention, a corresponding volume of task data can be allocated according to a capability of each computing subnode, and a task data volume of each computing subnode in a current round of task can be adjusted according to an execution status in a previous round. In this way, some unnecessary load balancing processes can be avoided, network consumption can be reduced, and data mining performance of a system can be improved.

Figure 8:
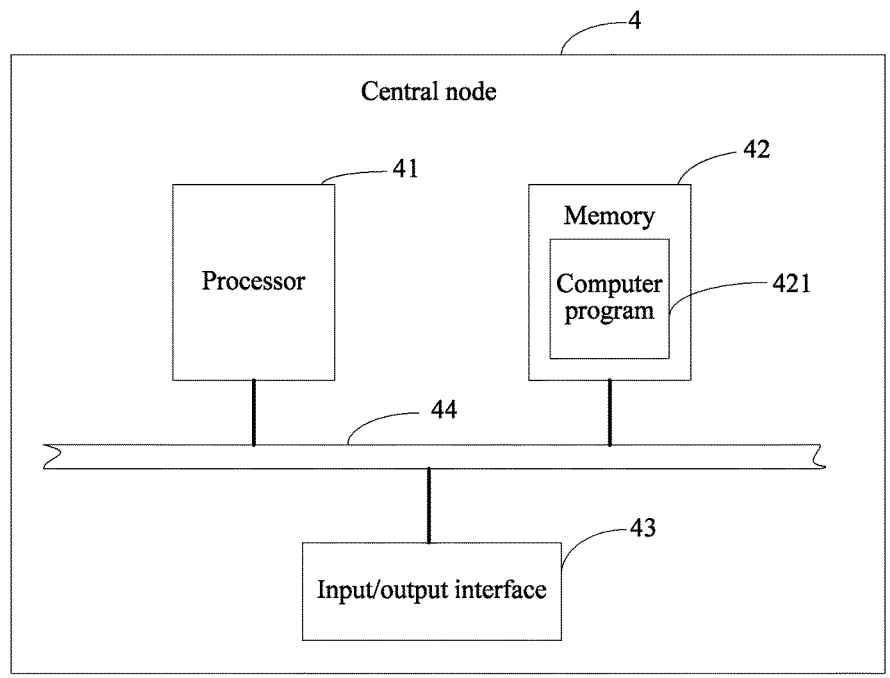
FIG. 8 is a schematic structural diagram of yet another central node according to an embodiment of the present invention.

An embodiment of the present invention provides a central node 4, which may be applied to a data mining system. As shown in FIG. 8, the central node 4 includes: a processor 41, a memory 42, and an input/output interface 43. The processor 41, the memory 42, and the input/output interface 43 are connected by using a bus 44. The input/output interface 43 is configured to interact with another network element. The memory 42 is configured to store a computer program 421. The processor 41 is configured to execute a computer program 421, so as to:

obtain predicted execution time of each computing subnode in the $N^{th}$ round of iterative task according to a time learning model;

determine, according to the predicted execution time of each computing subnode, whether load balancing needs to be performed in the $N^{th}$ round of iterative task;

when load balancing needs to be performed, reallocate task data to each computing subnode according to the predicted execution time of each computing subnode, where when load balancing does not need to be performed, no task data is reallocated to each computing subnode, and the task data is a part or all of data in an obtained to-be-mined sample data set;

after each computing subnode completes the $N^{th}$ round of iterative task according to the allocated task data, obtain execution status information of each computing subnode in the $N^{th}$ round of iterative task; and update a training parameter of the time learning model according to the execution status information of each computing subnode; if the execution of the iterative task has not completed, increase a value of N by 1, and repeat the step of obtaining predicted execution time of each computing subnode in the $N^{th}$ round of iterative task according to a time learning model to the step of updating a training parameter of the time learning model according to the execution status information of each computing subnode are repeated by using an updated time learning model, N is a positive integer, and a start value of N is 1.

Optionally, the time learning model may be established according to at least one parameter of actual execution time, a computing resource usage, or a historical task data volume.

Optionally, the time learning model may include:

Predicted execution time of a computing subnode i in the $N^{th}$ round of iterative task=a*Actual execution time of the computing subnode i in the $(N-1)^{th}$ round of iterative task+b*Computing resource usage of the computing subnode i in the $(N-1)^{th}$ round of iterative task+c*Historical task data volume of the computing subnode i in the $(N-1)^{th}$ round of iterative task+C, where a is an execution time training parameter, b is a computing resource usage training parameter, c is a historical task volume training parameter, C is a training constant, and i is a positive integer; the computing resource usage includes at least one of a CPU usage or a memory usage; and the historical task data volume of the computing subnode i in the $(N-1)^{th}$ round of iterative task is a volume of task data allocated to the computing subnode i in the $(N-1)^{th}$ round of iterative task.

Optionally, the processor 41 may be specifically configured to execute the computer program 421 to:

determine, among all the computing subnodes in the $N^{th}$ round of iterative task, a computing subnode with a longest predicted execution time and a computing subnode with a shortest predicted execution time;

obtain a predicted-execution-time difference proportion between the computing subnode with the longest predicted execution time and the computing subnode with the shortest predicted execution time; and compare the time difference proportion with a preset difference proportion threshold; and if the time difference proportion is less than or equal to the preset difference proportion threshold, determine that load balancing does not need to be performed in the $N^{th}$ round of iterative task; or if the time difference proportion is greater than the preset difference proportion threshold, determine that load balancing needs to be performed in the $N^{th}$ round of iterative task.

Optionally, the processor 41 may be specifically configured to execute the computer program 421 to:

determine a computing subnode whose predicted execution time is greater than standard execution time as an overloaded node, and determine a computing subnode whose predicted execution time is less than the standard execution time as an idle node;

obtain a proportion of tasks to be transferred from each overloaded node according to predicted execution time of each overloaded node and the standard execution time, and obtain, according to the proportion of tasks to be transferred from each overloaded node, a volume of task data that needs to be transferred from each overloaded node;

obtain a proportion of tasks to be received by each idle node according to predicted execution time of each idle node and the standard execution time, and obtain, according to the proportion of tasks to be received by each idle node, a volume of task data that can be received by each idle node; and sequentially transfer out, according to a volume, corresponding to the overloaded node, of task data that needs to be transferred, task data of each overloaded node in a descending order of predicted execution time of overloaded nodes, and sequentially transfer the task data into at least one idle node, which is sequenced in an ascending order of predicted execution time of idle nodes, according to the volume of task data that can be received by each idle node, until all task data that needs to be transferred from the overloaded nodes is transferred completely.

Optionally, the processor 41 may be specifically configured to execute the computer program 421 to:

divide a difference between the predicted execution time of each overloaded node and the standard execution time by the standard execution time, to obtain the proportion of tasks to be transferred from the overloaded node; and multiply a task data volume of task data stored on each overloaded node by the proportion of tasks to be transferred from the overloaded node, to obtain the volume of task data that needs to be transferred from the overloaded node; and the processor 41 may be specifically configured to execute the computer program 421 to:

divide an absolute value of a difference between the predicted execution time of each idle node and the standard execution time by the standard execution time, to obtain the proportion of tasks to be received by the idle node; and multiply a task data volume of task data stored on each idle node by the proportion of tasks to be received by the idle node, to obtain the volume of task data that can be received by the idle node.

Optionally, the execution status information of each computing subnode in the $N^{th}$ round of iterative task may include: at least one of actual execution time, a computing resource usage, or a task data volume of each computing subnode in the $N^{th}$ round of iterative task; and the task volume is a quantity of data subblocks in the $N^{th}$ round of iterative task, and the computing resource usage includes: at least one of a CPU usage or a memory usage.

Optionally, the processor 41 may be specifically configured to execute the computer program 421 to:

update at least one parameter of the execution time training parameter, the computing resource usage training parameter, or the historical task data volume training parameter of the time learning model according to the execution status information of each computing subnode.

Optionally, the processor 41 may be further specifically configured to execute the computer program 421 to:

after each computing subnode completes the $N^{th}$ round of iterative task, determine whether N is equal to a preset maximum iteration quantity; and if N is less than the maximum iteration quantity, determine that the iterative task has not ended; or if N is equal to the maximum iteration quantity, determine that the iterative task ends; or after each computing subnode completes the $N^{th}$ round of iterative task, determine whether an output result of the $N^{th}$ round of iteration meets a convergence condition; and if the convergence condition is not met, determine that the iterative task has not ended; or if the convergence condition is met, determine that the iterative task ends.

This embodiment of the present invention provides a central node. Predicted execution time of each computing subnode in a current round of iterative task is obtained according to a time learning model, and whether load balancing needs to be performed in the current round of iterative task is determined according to the predicted execution time; if load balancing needs to be performed, a volume of task data allocated to each computing subnode is adjusted; after the current round of iterative task is executed, execution status information of each computing subnode in the current round of iterative task is collected, and a training parameter of the time learning model is updated accordingly; and the foregoing process is repeated in a next round of iteration. Compared with the prior art in which load balancing is executed in each round of iterative task process, in this embodiment of the present invention, a corresponding volume of task data can be allocated according to a capability of each computing subnode, and a task data volume of each computing subnode in a current round of task can be adjusted according to an execution status in a previous round. In this way, some unnecessary load balancing processes can be avoided, network consumption can be reduced, and data mining performance of a system can be improved.

Figure 9:
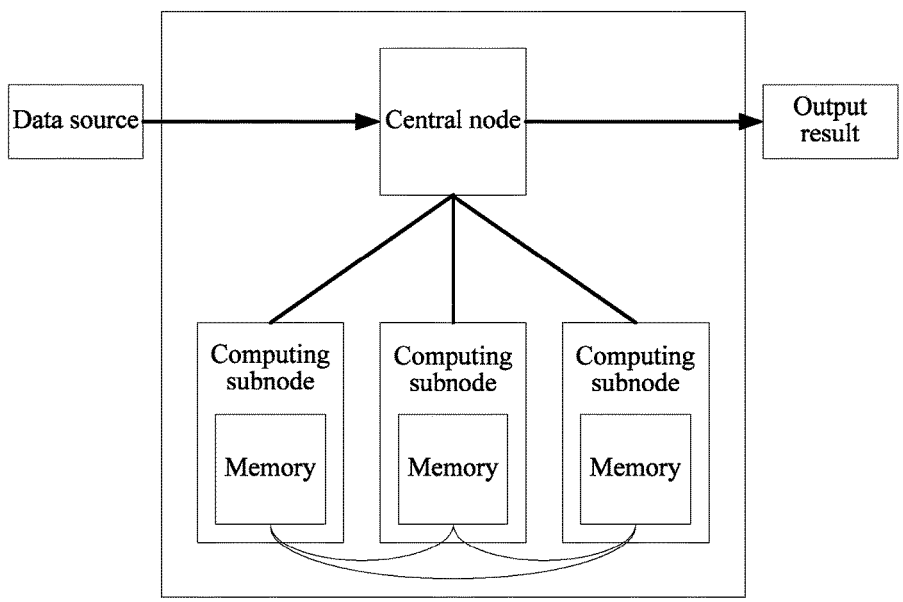
FIG. 9 is a schematic structural diagram of a data mining system according to an embodiment of the present invention.

An embodiment of the present invention provides a data mining system. As shown in FIG. 9, the system includes:

any one of the central nodes in the foregoing embodiments and at least two computing subnodes, where a memory is disposed in each computing subnode.

It should be noted that, any one of the foregoing central nodes and the data mining system provided in the embodiments may be configured to implement the following method embodiments. For working processes and working principles of the units in the embodiments, refer to descriptions in the following method embodiments.

Figure 10:
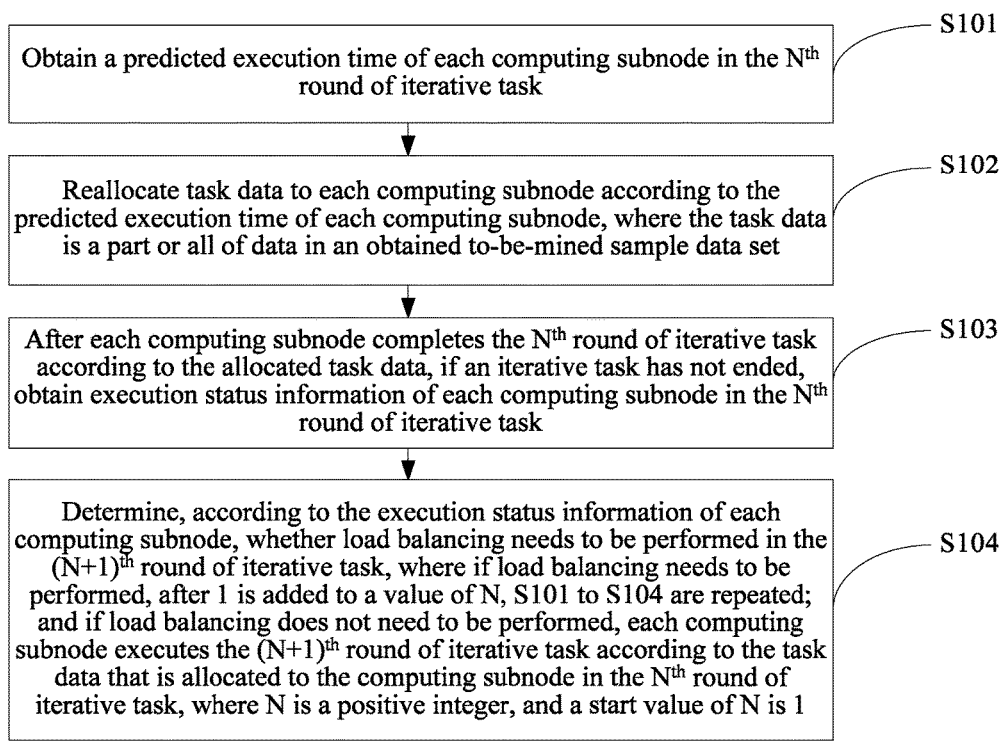
FIG. 10 is a schematic flowchart of a data mining method according to an embodiment of the present invention.

An embodiment of the present invention provides a data mining method. As shown in FIG. 10, the method includes the following steps:

S101: Obtain predicted execution time of each computing subnode in the $N^{th}$ round of iterative task.

S102: Reallocate task data to each computing subnode according to the predicted execution time of each computing subnode, where the task data is a part or all of data in an obtained to-be-mined sample data set.

S103: After each computing subnode completes the $N^{th}$ round of iterative task according to the allocated task data, if an iterative task has not ended, obtain execution status information of each computing subnode in the $N^{th}$ round of iterative task.

S104: Determine, according to the execution status information of each computing subnode, whether load balancing needs to be performed in the $(N+1)^{th}$ round of iterative task, where if load balancing needs to be performed, after 1 is added to a value of N, S101 to S104 are repeated; and if load balancing does not need to be performed, each computing subnode executes the $(N+1)^{th}$ round of iterative task according to the task data that is allocated to the computing subnode in the $N^{th}$ round of iterative task, where N is a positive integer, and a start value of N is 1.

Figure 11:
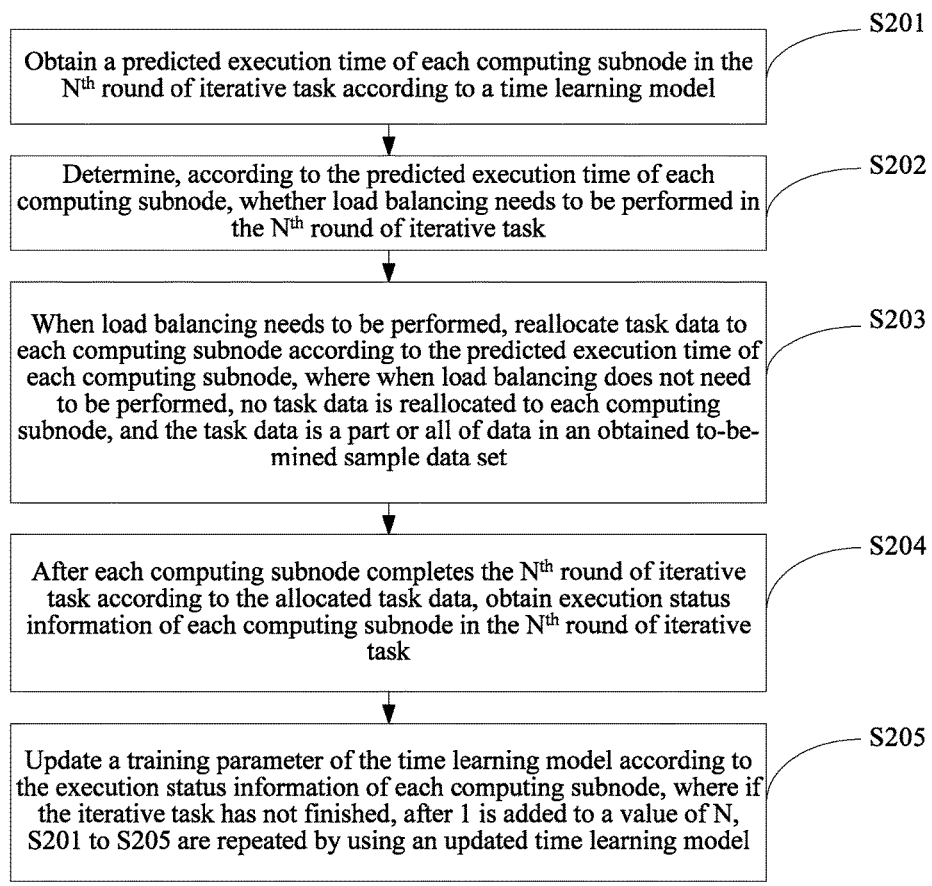
FIG. 11 is a schematic flowchart of another data mining method according to an embodiment of the present invention.

This embodiment further provides another data mining method. As shown in FIG. 11, the method includes the following steps:

S201: Obtain predicted execution time of each computing subnode in the $N^{th}$ round of iterative task according to a time learning model.

S202: Determine, according to the predicted execution time of each computing subnode, whether load balancing needs to be performed in the $N^{th}$ round of iterative task.

S203: When load balancing needs to be performed, reallocate task data to each computing subnode according to the predicted execution time of each computing subnode, where when load balancing does not need to be performed, no task data is reallocated to each computing subnode, and the task data is a part or all of data in an obtained to-be-mined sample data set.

S204: After each computing subnode completes the $N^{th}$ round of iterative task according to the allocated task data, obtain execution status information of each computing subnode in the $N^{th}$ round of iterative task.

S205: Update a training parameter of the time learning model according to the execution status information of each computing subnode, where if the iterative task has not ended, after 1 is added to a value of N, S201 to S205 are repeated by using an updated time learning model.

This embodiment of the present invention provides a data mining method. Predicted execution time of each computing subnode in a current round of iterative task is obtained, and a corresponding volume of task data is allocated to the computing subnode according to the predicted execution time; after the current round of iterative task is executed, execution status information of each computing subnode in the current round of iterative task is collected, and whether the task data volume of each computing subnode needs to be adjusted in a next round of iterative task is determined accordingly; and the next round of iterative task is performed according to the adjusted task data volume. Alternatively, predicted execution time of each computing subnode in a current round of iterative task is obtained according to a time learning model, and whether load balancing needs to be performed in the current round of iterative task is determined according to the predicted execution time; if load balancing needs to be performed, a volume of task data allocated to each computing subnode is adjusted; after the current round of iterative task is executed, execution status information of each computing subnode in the current round of iterative task is collected, and a training parameter of the time learning model is updated accordingly; and the foregoing process is repeated in a next round of iteration. Compared with the prior art in which load balancing is executed in each round of iterative task process, in this embodiment of the present invention, a corresponding volume of task data can be allocated according to a capability of each computing subnode, and a task data volume of each computing subnode in a current round of task can be adjusted according to an execution status in a previous round. In this way, some unnecessary load balancing processes can be avoided, network consumption can be reduced, and data mining performance of a system can be improved.

Figure 12:
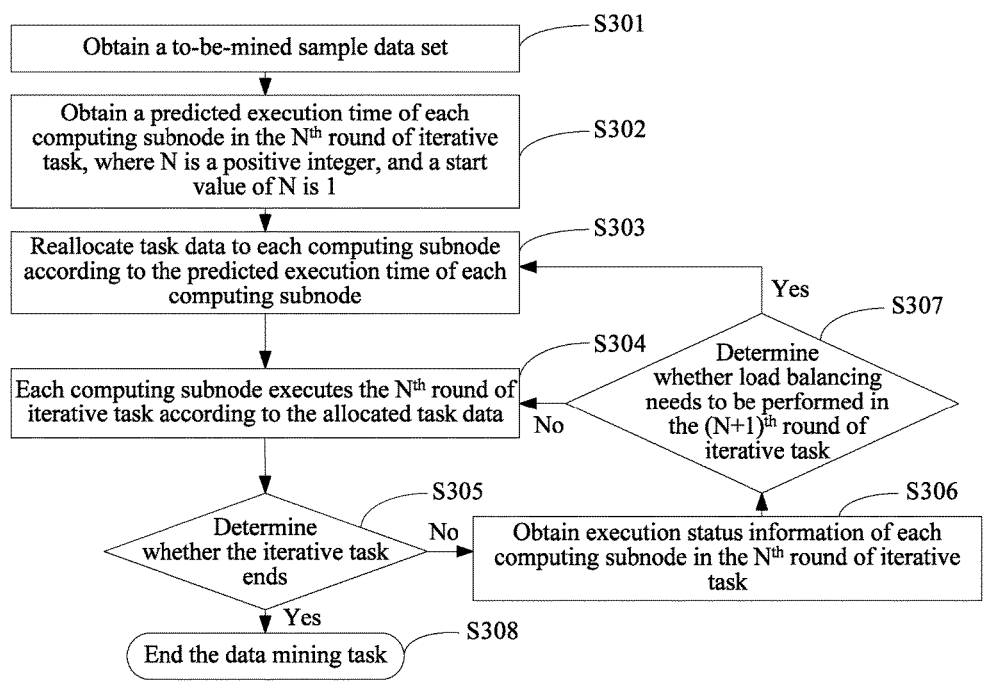
FIG. 12 is a schematic flowchart of still another data mining method according to an embodiment of the present invention.

To make persons skilled in the art understand the technical solution provided in this embodiment of the present invention more clearly, the data mining method provided in this embodiment of the present invention is described below in detail by using a specific embodiment. As shown in FIG. 12, the method includes the following steps.

S301: Obtain a to-be-mined sample data set.

For example, a data set is imported, as a sample data set, from an external data source to a data mining system (briefly referred to as a mining system below). A common external data source may be a data warehouse, a database, open database connectivity (Open Database Connectivity, ODBC), and a file stored in a file system. The imported data set may consist of massive unprocessed data, and may be in a list form.

After the sample data set is obtained, the sample data set is first divided into multiple data subblocks according to a preset rule, and the data subblocks are used as task data initially allocated to computing subnodes in the mining system, and are stored in the computing subnodes. The preset rule may be: evenly dividing the sample data set into data blocks of a same data volume and allocating the data blocks to the computing subnodes. For example, if the sample data set includes 10 million lines of data to be allocated to 10 computing subnodes, 1 million lines of data may be allocated to each computing subnode. Alternatively, division may be performed according to a computing resource (a CPU frequency, a memory capacity, or the like) of each computing subnode. For example, division may be performed according to proportions of memory capacities of the computing subnodes. Then, task data obtained after the division is stored in a storage device of a corresponding computing subnode, where the storage device may be a hard disk, or may be a memory. If the task data is stored in a hard disk, when a mining task starts, to-be-processed data needs to be read in a memory for a mining process.

S302: Obtain predicted execution time of each computing subnode in the $N^{th}$ round of iterative task, where N is a positive integer, and a start value of N is 1.

When N is equal to 1, that is, when the first round of iterative task of a mining task starts, because the iterative task is executed for the first time, an execution time of the current round needs to be pre-estimated. Therefore, predicted execution time in the first round may be obtained in the following manner:

The predicted execution time of each computing subnode is obtained according to a distribution characteristic parameter of the sample data set and a computing resource of each computing subnode. The distribution characteristic parameter of the sample data set may include: an average value, a variance, a quantity of different values, and a value range that are of values, in a same field, of data in the sample data set. For example, using the sample data set in a list form as an example, values in a same column are values in a same field. When an average value, a variance, a value range, a quantity of different values of all the values in the column are obtained, a distribution characteristic parameter of data in the field in the sample data set is obtained. Likewise, distribution characteristic parameters of the entire sample data set may be obtained. The computing resource of each computing subnode may include: at least one of a CPU frequency or a memory capacity of the computing subnode.

By way of example, the predicted execution time of the computing subnode may be obtained by multiplying the quantity of different values by an empirical coefficient of a preset algorithm (which may be a complexity degree of the algorithm) and then dividing the product by an operational frequency of a CPU of the computing subnode. The preset algorithm may be selected according to an actual need, which is not limited in this embodiment. The calculation method is only an example, and is included in this embodiment but this embodiment is not limited thereto.

When N is greater than 1, that is, when a non-first round of iterative task of the mining task is executed, actual execution time at which each computing subnode executes the $(N-1)^{th}$ round of iterative task may be used as the predicted execution time of the computing subnode in the $N^{th}$ round of iterative task.

In addition, besides the distribution characteristic parameter of the sample data set and the computing resource of each computing subnode, the predicted execution time may be obtained further by using one or more of parameters such as a task data volume of each computing subnode in the $(N-1)^{th}$ round of iterative task, a hardware configuration of the computing subnode, and network load.

S303: Reallocate task data to each computing subnode according to the predicted execution time of each computing subnode.

Specifically, this step includes:

determining a computing subnode whose predicted execution time is greater than standard execution time as an overloaded node, and determining a computing subnode whose predicted execution time is less than the standard execution time as an idle node;

obtaining a proportion of tasks to be transferred from each overloaded node according to predicted execution time of each overloaded node and the standard execution time, and obtaining, according to the proportion of tasks to be transferred from each overloaded node, a volume of task data that needs to be transferred from each overloaded node;

obtaining a proportion of tasks to be received by each idle node according to predicted execution time of each idle node and the standard execution time, and obtaining, according to the proportion of tasks to be received by each idle node, a volume of task data that can be received by each idle node; and sequentially transferring out, according to a volume, corresponding to the overloaded node, of task data that needs to be transferred, task data of each overloaded node in a descending order of predicted execution time of overloaded nodes, and sequentially transferring the task data into at least one idle node, which is sequenced in an ascending order of predicted execution time of idle nodes, according to the volume of task data that can be received by each idle node, until all task data that needs to be transferred from the overloaded nodes is transferred completely.

The obtaining a volume of task data that needs to be transferred from each overloaded node may include:

dividing a difference between the predicted execution time of each overloaded node and the standard execution time by the standard execution time, to obtain the proportion of tasks to be transferred from the overloaded node; and multiplying a task data volume of task data stored on each overloaded node by the proportion of tasks to be transferred from the overloaded node, to obtain the volume of task data that needs to be transferred from the overloaded node.

The obtaining a volume of task data that can be received by each idle node may include:

dividing an absolute value of a difference between the predicted execution time of each idle node and the standard execution time by the standard execution time, to obtain the proportion of tasks to be received by the idle node; and multiplying a task data volume of task data stored on each idle node by the proportion of tasks to be received by the idle node, to obtain the volume of task data that can be received by the idle node.

By way of example, it is assumed that the mining system includes eight computing subnodes: a node 1, a node 2, a node 3, a node 4, a node 5, a node 6, a node 7, and a node 8. It is assumed that standard execution time is 100 s, predicted execution time of the nodes 1 to 8 are shown in Table 1, and volumes of task data stored on the nodes 1 to 8 are shown in Table 2.

TABLE 1

| Node | Node 1 | Node 2 | Node 3 | Node 4 | Node 5 | Node 6 | Node 7 | Node 8 |
| --- | --- | --- | --- | --- | --- | --- | --- | --- |
| Predicted execution time (s) | 130 | 120 | 100 | 110 | 100 | 60 | 80 | 90 |

TABLE 2

| Node | Node 1 | Node 2 | Node 3 | Node 4 | Node 5 | Node 6 | Node 7 | Node 8 |
| --- | --- | --- | --- | --- | --- | --- | --- | --- |
| Task data volume (ten thousands lines) | 1000 | 900 | 800 | 850 | 700 | 1000 | 600 | 950 |

According to the predicted execution time of the computing subnodes in Table 1, it may be determined that the node 1, the node 2, and the node 4 are overloaded nodes, and that the node 6, the node 7, and the node 8 are idle nodes.

It can be obtained through calculation that a proportion of tasks to be transferred from the node 1 is equal to (130−100)÷100×100%=30%, and then 30% may be multiplied by 10 million lines to obtain that a volume of task data that needs to be transferred from the node 1 is 3 million lines. Likewise, it may be obtained that volumes of task data that needs to be transferred from the node 2 and the node 4 are 1.8 million lines and 0.85 million lines respectively. A proportion of tasks to be received by the node 6 is equal to (100−60)÷100×100%=40%, and then 40% is multiplied by 10 million lines to obtain that a volume of task data that can be received by the node 1 is 4 million lines. Likewise, it may be obtained that volumes of task data that can be received by the node 7 and the node 8 are 1.2 million lines and 0.95 million lines respectively.

Then, data is transferred. It may be seen from Table 1 that a descending order of predicted execution time of the node 1, the node 2, the node 4, the node 6, the node 7, and the node 8 is: the node 1, the node 2, the node 4, the node 8, the node 7, and the node 6. Therefore, when data is transferred, first, task data that needs to be transferred from the node 1 is preferentially received by the node 6. It may be known according to the foregoing calculation that, after all the task data that needs to be transferred from the node 1 is received by the node 6, the node 6 still has free space. Then task data that needs to be transferred from the node 2 is received by the node 6. When space for a volume of task data that can be received by the node 6 is used up, task data that needs to be transferred from the node 2 is received by the node 7, and so on, until all task data that needs to be transferred from the node 1, the node 2, and the node 4 is transferred completely.

S304: Each computing subnode executes the $N^{th}$ round of iterative task according to the allocated task data.

Figure 13:
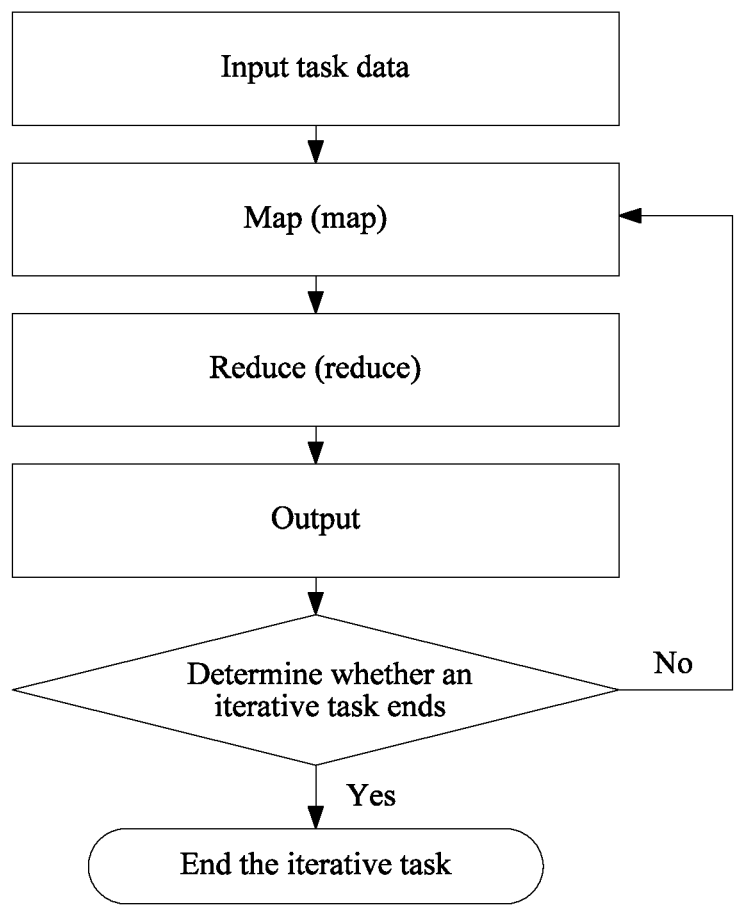
FIG. 13 is a schematic flowchart of execution of an iterative task according to an embodiment of the present invention.

By way of example, the iterative task may be executed by using a Mahout platform (an extensible machine learning and data mining platform of the Apache Software Foundation), whose architecture is based on a MapReduce frame and whose computing process includes two steps: Map (map) and Reduce (reduce). Executing Map is to obtain an intermediate result based on a key-value pair according to data, and executing Reduce is to gather key-value pairs to generate an output result. As shown in FIG. 13, in a process of executing an iterative task by using Mahout based on MapReduce, the two steps: Map and Reduce are performed repeatedly. Each time a MapReduce task is executed completely, its result is output, and then an effect of a generated model is checked. If a requirement of the iterative task is met, the generated model is a final result (which may be understood as that a model parameter is adjusted to an optimal value). Otherwise, a next round of iteration is executed, and Map and Reduce steps are executed repeatedly.

S305: After the $N^{th}$ round of iterative task is completed, determine whether the iterative task ends. If the iterative task has not ended, S306 is performed; otherwise, S308 is performed.

By way of example, a method for determining whether the iterative task ends may include:

after each computing subnode completes the $N^{th}$ round of iterative task, determining whether N is equal to a preset maximum iteration quantity; and if N is less than the maximum iteration quantity, determining that the iterative task has not ended; or if N is equal to the maximum iteration quantity, determining that the iterative task ends.

For example, the maximum iteration quantity is set to 200. If N is less than 200, the iterative task has not ended. If N is equal to 200, it is determined that the iterative task ends.

Alternatively, after each computing subnode completes the $N^{th}$ round of iterative task, it is determined whether an output result of the $N^{th}$ round of iteration meets a convergence condition (for example, whether a parameter of a model used in the iteration has been adjusted to an optimal parameter). If the convergence condition is not met, it is determined that the iterative task has not ended. If the convergence condition is met, it is determined that the iterative task ends.

S306: Obtain execution status information of each computing subnode in the $N^{th}$ round of iterative task.

The execution status information of each computing subnode may be: at least one of actual execution time, a computing resource usage, or a task data volume of each computing subnode in the $N^{th}$ round of iterative task; the computing resource usage includes: at least one of a CPU usage or a memory usage.

S307: Determine, according to the execution status information of each computing subnode, whether load balancing needs to be performed in the $(N+1)^{th}$ round of iterative task. If load balancing needs to be performed, after 1 is added to a value of N, S302 to S307 are repeated. If load balancing does not need to be performed, each computing subnode directly executes the $(N+1)^{th}$ round of iterative task according to the task data allocated to the computing subnode in the $N^{th}$ round of iterative task.

By way of example, a computing subnode with a longest actual execution time and a computing subnode with a shortest actual execution time in the $N^{th}$ round of iterative task may be first determined among all the computing subnodes;

an actual-execution-time difference proportion between the computing subnode with the longest actual execution time and the computing subnode with the shortest actual execution time is obtained; and the time difference proportion is compared with a preset difference proportion threshold; and if the time difference proportion is less than or equal to the preset difference proportion threshold, it is determined that load balancing does not need to be performed in the $(N+1)^{th}$ iterative task; or if the time difference proportion is greater than the preset difference proportion threshold, it is determined that load balancing needs to be performed in the $(N+1)^{th}$ iterative task.

For example, the difference proportion threshold is set to 10%. Assuming that in the $N^{th}$ round of iterative task, actual execution time of the computing subnode with the longest actual execution time is 120 s, and actual execution time of the computing subnode with the shortest actual execution time is 100 s, a difference proportion between the actual execution times of the two computing subnodes is 20%, which is greater than the difference proportion threshold. Therefore, it is determined that load balancing needs to be performed in the $(N+1)^{th}$ round of iterative task. For another example, in the $N^{th}$ round of iterative task, actual execution time of the computing subnode with the longest actual execution time is 105 s, and actual execution time of the computing subnode with the shortest actual execution time is 100 s; a difference proportion between the actual execution times of the two computing subnodes is 5%, which is less than the difference proportion threshold. Therefore, it is determined that load balancing does not need to be performed in the $(N+1)^{th}$ round of iterative task.

S308: End the data mining task.

Figure 14:
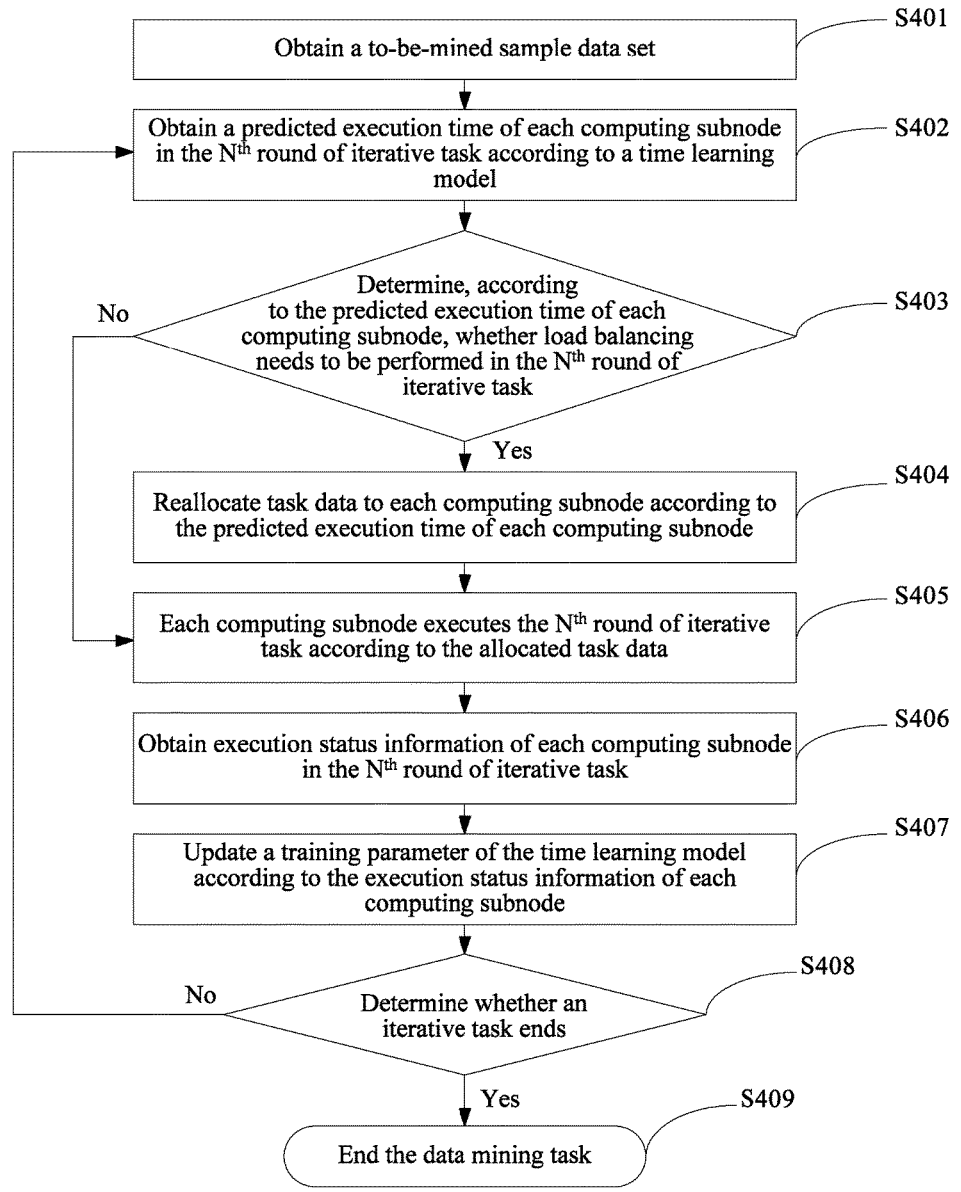
FIG. 14 is a schematic flowchart of yet another data mining method according to an embodiment of the present invention.

In another implementation manner of the data mining method provided in this embodiment of the present invention, as shown in FIG. 14, the method includes the following steps.

S401: Obtain a to-be-mined sample data set (this step is completely the same as S301; refer to S301 for details, which are not provided herein again).

S402: Obtain predicted execution time of each computing subnode in the $N^{th}$ round of iterative task according to a time learning model.

By way of example, the time learning model may be established according to at least one parameter of actual execution time, a computing resource usage, or a historical task data volume.

For example, the model may include: Predicted execution time of a computing subnode i in the $N^{th}$ round of iterative task=a*Actual execution time of the computing subnode i in the $(N-1)^{th}$ round of iterative task+b*Computing resource usage of the computing subnode i in the $(N-1)^{th}$ round of iterative task+c*Historical task data volume of the computing subnode i in the $(N-1)^{th}$ round of iterative task+C, where a is an execution time training parameter, b is a computing resource usage training parameter, c is a historical task volume training parameter, C is a training constant, and i is a positive integer; the computing resource usage includes at least one of a CPU usage or a memory usage; the historical task data volume of the computing subnode i in the $(N-1)^{th}$ round of iterative task is a volume of task data allocated to the computing subnode i in the (N−1)$^{th}$ round of iterative task; and the computing subnode i is any computing subnode in the data mining system.

For example, it is assumed that a is set to 0.95, b is set to 10, c is set to 0 (which may be understood as that a historical task data volume training parameter is not considered), and C is set to 0.5. It is assumed that the actual execution time of the computing subnode i in the (N−1)$^{th}$ round of iterative task is 100 s. The computing resource usage is a CPU usage of the computing subnode and is assumed to be 50%. Therefore, the predicted execution time of the computing subnode i in the N$^{th}$ round of iterative task is equal to 0.95×100+10×50%+0.5=100.5 s.

In addition, besides the actual execution time, the computing resource usage, and the historical task data volume, the predicted execution time may be obtained further by using one or more of parameters such as a task data volume of each computing subnode in the (N−1)$^{th}$ round of iterative task, a hardware configuration of the computing subnode, and network load.

S403: Determine, according to the predicted execution time of each computing subnode, whether load balancing needs to be performed in the N$^{th}$ round of iterative task. If load balancing needs to be performed, S404 is performed; otherwise, S405 is directly performed.

Specifically, this step may include:

determining, among all the computing subnodes in the N$^{th}$ round of iterative task, a computing subnode with a longest predicted execution time and a computing subnode with a shortest predicted execution time;

obtaining a predicted-execution-time difference proportion between the computing subnode with the longest predicted execution time and the computing subnode with the shortest predicted execution time; and comparing the time difference proportion with a preset difference proportion threshold; and if the time difference proportion is less than or equal to the preset difference proportion threshold, determining that load balancing does not need to be performed in the N$^{th}$ round of iterative task; or if the time difference proportion is greater than the preset difference proportion threshold, determining that load balancing needs to be performed in the N$^{th}$ round of iterative task.

For example, the difference proportion threshold is set to 10%. Assuming that in the N$^{th}$ round of iterative task, predicted execution time of the computing subnode with the longest predicted execution time is 120 s, and predicted execution time of the computing subnode with the shortest predicted execution time is 95 s, a difference proportion between the predicted execution time of the two computing subnodes is 26.3%, which is greater than the difference proportion threshold. Therefore, it is determined that load balancing needs to be performed in the (N+1)$^{th}$ round of iterative task. For another example, in the N$^{th}$ round of iterative task, predicted execution time of the computing subnode with the longest predicted execution time is 107 s, and predicted execution time of the computing subnode with the shortest predicted execution time is 100 s, then a difference proportion between the predicted execution time of the two computing subnodes is 7%, which is less than the difference proportion threshold. Therefore, it is determined that load balancing does not need to be performed in the (N+1)$^{th}$ round of iterative task.

S404: Reallocate task data to each computing subnode according to the predicted execution time of each computing subnode (this step is completely the same as S303; refer to S303 for details, which are not provided herein again).

S405: Each computing subnode executes the N$^{th}$ round of iterative task according to the allocated task data (this step is completely the same as S304; refer to S304 for details, which are not provided herein again).

S406: Obtain execution status information of each computing subnode in the N$^{th}$ round of iterative task (this step is completely the same as S306; refer to S306 for details, which are not provided herein again).

S407: Update a training parameter of the time learning model according to the execution status information of each computing subnode.

Specifically, at least one parameter of the execution time training parameter, the computing resource usage training parameter, or the historical task data volume training parameter of the time learning model may be updated according to the execution status information of each computing subnode.

S408: After the N$^{th}$ round of iterative task is completed, determine whether an iterative task ends. If the iterative task has not ended, S402 to S408 are repeated by using an updated time learning model; otherwise, S409 is performed.

S409: End the data mining task.

This embodiment of the present invention provides a data mining method. Predicted execution time of each computing subnode in a current round of iterative task is obtained, and a corresponding volume of task data is allocated to the computing subnode according to the predicted execution time; after the current round of iterative task is executed, execution status information of each computing subnode in the current round of iterative task is collected, and whether the task data volume of each computing subnode needs to be adjusted in a next round of iterative task is determined accordingly, and the next round of iterative task is performed according to the adjusted task data volume. Alternatively, predicted execution time of each computing subnode in a current round of iterative task is obtained according to a time learning model, and whether load balancing needs to be performed in the current round of iterative task is determined according to the predicted execution time; if load balancing needs to be performed, a volume of task data allocated to each computing subnode is adjusted; after the current round of iterative task is executed, execution status information of each computing subnode in the current round of iterative task is collected, and a training parameter of the time learning model is updated accordingly; and the foregoing process is repeated in a next round of iteration. Compared with the prior art in which load balancing is executed in each round of iterative task process, in this embodiment of the present invention, a corresponding volume of task data can be allocated according to a capability of each computing subnode, and a task data volume of each computing subnode in a current round of task can be adjusted according to an execution status in a previous round. In this way, some unnecessary load balancing processes can be avoided, network consumption can be reduced, and data mining performance of a system can be improved.

In the several embodiments provided in the present invention, it should be understood that the disclosed node, system, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A central node, for a data mining system, wherein the central node comprises:
    memory storing computer program for execution; and
    a processor coupled to the memory and configured to execute the computer program to:
        obtain predicted execution time of each computing subnode in the $N^{th}$ round of iteration of a task;
        reallocate task data for each computing subnode according to the predicted execution time of each computing subnode, wherein the task data is a part or all of data in an obtained to-be-mined sample dataset;
        after each computing subnode completes the $N^{th}$ round of iteration of the task according to the allocated task data, if the task has not ended, obtain execution status information of each computing subnode in the $N^{th}$ round of iteration of the task;
        determine, according to the execution status information of each computing subnode, whether load balancing needs to be performed in the $(N+1)^{th}$ round of iteration of the task;
        if load balancing is determined to be performed, perform the load balancing by:
            increasing a value of N by 1, and
            repeating the step of obtaining the predicted execution time of each computing subnode in the $N^{th}$ round of iteration of the task to the step of determining, according to the execution status information of each computing subnode, whether load balancing needs to be performed in the $(N+1)^{th}$ round of iteration of the task; and
        if load balancing is determined not to be performed, execute, at each computing subnode, the $(N+1)^{th}$ round of iteration of the task according to the task data that is allocated to the computing subnode in the $N^{th}$ round of iteration of the task, wherein N is a positive integer, and a start value of N is 1.

2. The central node according to claim 1, wherein when N is equal to 1, the processor is further configured to:
    obtain the predicted execution time of each computing subnode according to a distribution characteristic parameter of the sample data set and a computing resource of each computing subnode, wherein
    the distribution characteristic parameter of the sample data set comprises: an average value, a variance, a quantity of different values, and a value range that are of values, in a same field, of data in the sample data set; and
    the computing resource of each computing subnode comprises: at least one of a CPU frequency or a memory capacity of the computing subnode.

3. The central node according to claim 1, wherein when N is greater than 1, the processor is further configured to:
    use actual execution time at which each computing subnode executes the $(N-1)^{th}$ round of iteration of the task as the predicted execution time of the computing subnode in the $N^{th}$ round of iteration of the task.

4. The central node according to claim 1, wherein the processor is further configured to:
    determine a computing subnode whose predicted execution time is greater than standard execution time as an overloaded node, and determine a computing subnode whose predicted execution time is less than the standard execution time as an idle node;
    obtain a proportion of tasks to be transferred from each overloaded node according to predicted execution time of each overloaded node and the standard execution time, and obtain, according to the proportion of tasks to be transferred from each overloaded node, a volume of task data that needs to be transferred from each overloaded node;
    obtain a proportion of tasks to be received by each idle node according to predicted execution time of each idle node and the standard execution time, and obtain, according to the proportion of tasks to be received by each idle node, a volume of task data that is capable of being received by each idle node; and
    sequentially transfer out, according to a volume, corresponding to the overloaded node, of task data that needs to be transferred, task data of each overloaded node in a descending order of predicted execution time of overloaded nodes, and sequentially transfer the task data into at least one idle node, which is sequenced in an ascending order of predicted execution time of idle nodes, according to the volume of task data that is capable of being received by each idle node, until all task data that needs to be transferred from the overloaded nodes is transferred completely.

5. The central node according to claim 4, wherein the processor is further configured to:
    divide a difference between the predicted execution time of each overloaded node and the standard execution time by the standard execution time, to obtain the proportion of tasks to be transferred from the overloaded node;

multiply a task data volume of task data stored on each overloaded node by the proportion of tasks to be transferred from the overloaded node, to obtain the volume of task data that needs to be transferred from the overloaded node;

divide an absolute value of a difference between the predicted execution time of each idle node and the standard execution time by the standard execution time, to obtain the proportion of tasks to be received by the idle node; and multiply a task data volume of task data stored on each idle node by the proportion of tasks to be received by the idle node, to obtain the volume of task data that is capable of being received by the idle node.

6. The central node according to claim 1, wherein the execution status information of each computing subnode in the $N^{th}$ round of iteration of the task comprises: at least one of actual execution time, a computing resource usage, or a task data volume of each computing subnode in the $N^{th}$ round of iteration of the task; and the computing resource usage comprises: at least one of a CPU usage or a memory usage.

7. The central node according to claim 6, wherein the processor is further configured to:

determine, among all the computing subnodes in the $N^{th}$ round of iteration of the task, a computing subnode with a longest actual execution time and a computing subnode with a shortest actual execution time;

obtain an actual-execution-time difference proportion between the computing subnode with the longest actual execution time and the computing subnode with the shortest actual execution time; and compare the time difference proportion with a preset difference proportion threshold; and if the time difference proportion is less than or equal to the preset difference proportion threshold, determine that load balancing does not need to be performed in the $(N+1)^{th}$ round of iteration of the task; or if the time difference proportion is greater than the preset difference proportion threshold, determine that load balancing needs to be performed in the $(N+1)^{th}$ round of iteration of the task.

8. A central node, applied to a data mining system, wherein the central node comprises:

memory storing computer program for execution; and a processor coupled to the memory and configured to execute the computer program to perform:

obtain predicted execution time of each computing subnode in the $N^{th}$ round of iteration of a task according to a time learning model;

determine, according to the predicted execution time of each computing subnode, whether load balancing needs to be performed in the $N^{th}$ round of iteration of the task;

when load balancing needs to be performed, reallocate task data for each computing subnode according to the predicted execution time of each computing subnode, wherein when load balancing does not need to be performed, no task data is reallocated to each computing subnode, and the task data is a part or all of data in an obtained to-be-mined sample data set; after each computing subnode completes the $N^{th}$ round of iteration of the task according to the allocated task data, obtain execution status information of each computing subnode in the $N^{th}$ round of iteration of the task; and update a training parameter of a time learning model according to the execution status information of each computing subnode, wherein if the task has not ended, after 1 is added to a value of N, the step of obtaining predicted execution time of each computing subnode in the $N^{th}$ round of iteration of the task according to a time learning model to the step of updating a training parameter of the time learning model according to the execution status information of each computing subnode are repeated by using an updated time learning model.

9. The central node according to claim 8, wherein the time learning model is established according to at least one parameter of actual execution time, a computing resource usage, or a historical task data volume.

10. The central node according to claim 9, wherein the time learning model comprises:

predicted execution time of a computing subnode i in the $N^{th}$ round of iteration of the task=a*Actual execution time of the computing subnode i in the $(N-1)^{th}$ round of iteration of the task+b*Computing resource usage of the computing subnode i in the $(N-1)^{th}$ round of iteration of the task+c*Historical task data volume of the computing subnode i in the $(N-1)^{th}$ round of iteration of the task+C, wherein a is an execution time training parameter, b is a computing resource usage training parameter, c is a historical task volume training parameter, C is a training constant, and i is a positive integer; the computing resource usage comprises at least one of a CPU usage or a memory usage; and the historical task data volume of the computing subnode i in the $(N-1)^{th}$ round of iteration of the task is a volume of task data allocated to the computing subnode i in the $(N-1)^{th}$ round of iteration of the task.

11. The central node according to claim 10, wherein the processor is further configured to:

update at least one parameter of the execution time training parameter, the computing resource usage training parameter, or the historical task data volume training parameter of the time learning model according to the execution status information of each computing subnode.

12. The central node according to claim 8, wherein the processor is further configured to:

determine, among all the computing subnodes in the $N^{th}$ round of iteration of the task, a computing subnode with longest predicted execution time and a computing subnode with shortest predicted execution time;

obtain a predicted-execution-time difference proportion between the computing subnode with the longest predicted execution time and the computing subnode with the shortest predicted execution time; and compare the time difference proportion with a preset difference proportion threshold; and if the time difference proportion is less than or equal to the preset difference proportion threshold, determine that load balancing does not need to be performed in the $N^{th}$ round of iteration of the task; or if the time difference proportion is greater than the preset difference proportion threshold, determine that load balancing needs to be performed in the $N^{th}$ round of iteration of the task.

13. The central node according to claim 8, wherein the processor is further configured to:

determine a computing subnode whose predicted execution time is greater than standard execution time as an overloaded node, and determine a computing subnode whose predicted execution time is less than the standard execution time as an idle node;

obtain a proportion of tasks to be transferred from each overloaded node according to predicted execution time of each overloaded node and the standard execution time, and obtain, according to the proportion of tasks to be transferred from each overloaded node, a volume of task data that needs to be transferred from each overloaded node;

obtain a proportion of tasks to be received by each idle node according to predicted execution time of each idle node and the standard execution time, and obtain, according to the proportion of tasks to be received by each idle node, a volume of task data that is capable of being received by each idle node; and sequentially transfer out, according to a volume, corresponding to the overloaded node, of task data that needs to be transferred, task data of each overloaded node in a descending order of predicted execution time of overloaded nodes, and sequentially transfer the task data into at least one idle node, which is sequenced in an ascending order of predicted execution time of idle nodes, according to the volume of task data that is capable of being received by each idle node, until all task data that needs to be transferred from the overloaded nodes is transferred completely.

14. The central node according to claim 13, wherein the processor is further configured to:

divide a difference between the predicted execution time of each overloaded node and the standard execution time by the standard execution time, to obtain the proportion of tasks to be transferred from the overloaded node;

multiply a task data volume of task data stored on each overloaded node by the proportion of tasks to be transferred from the overloaded node, to obtain the volume of task data that needs to be transferred from the overloaded node;

divide an absolute value of a difference between the predicted execution time of each idle node and the standard execution time by the standard execution time, to obtain the proportion of tasks to be received by the idle node; and multiply a task data volume of task data stored on each idle node by the proportion of tasks to be received by the idle node, to obtain the volume of task data that is capable of being received by the idle node.

15. The central node according to claim 8, wherein the execution status information of each computing subnode in the $N^{th}$ round of iteration of the task comprises: at least one of actual execution time, a computing resource usage, or a task data volume of each computing subnode in the $N^{th}$ round of iteration of the task; and the computing resource usage comprises: at least one of a CPU usage or a memory usage.

16. A data mining method, wherein the method comprises:

obtaining predicted execution time of each computing subnode in the $N^{th}$ round of iteration of a task;

reallocating task data for each computing subnode according to the predicted execution time of each computing subnode, wherein the task data is a part or all of data in an obtained to-be-mined sample data set;

after each computing subnode completes the $N^{th}$ round of iteration of the task according to the allocated task data, if the task has not ended, obtaining execution status information of each computing subnode in the $N^{th}$ round of iteration of the task; and determining, according to the execution status information of each computing subnode, whether load balancing needs to be performed in the $(N+1)^{th}$ round of iteration of the task;

if load balancing needs to be performed, perform the load balancing by:

increasing a value of N by 1, and repeating the step of obtaining predicted execution time of each computing subnode in the $N^{th}$ round of iteration of the task to the step of determining, according to the execution status information of each computing subnode, whether load balancing needs to be performed in the $(N+1)^{th}$ round of iteration of the task are repeated; and if load balancing does not need to be performed, execute, at each computing subnode, the $(N+1)^{th}$ round of iteration of the task according to the task data that is allocated to the computing subnode in the $N^{th}$ round of iteration of the task, wherein N is a positive integer, and a start value of N is 1.

17. The method according to claim 16, wherein when N is greater than 1, the obtaining predicted execution time of each computing subnode in the $N^{th}$ round of iteration of the task comprises:

using actual execution time at which each computing subnode executes the $(N-1)^{th}$ round of iteration of the task as the predicted execution time of the computing subnode in the $N^{th}$ round of iteration of the task.

18. The method according to claim 16, wherein the reallocating task data for each computing subnode according to the predicted execution time of each computing subnode comprises:

determining a computing subnode whose predicted execution time is greater than standard execution time as an overloaded node, and determining a computing subnode whose predicted execution time is less than the standard execution time as an idle node;

obtaining a proportion of tasks to be transferred from each overloaded node according to predicted execution time of each overloaded node and the standard execution time, and obtaining, according to the proportion of tasks to be transferred from each overloaded node, a volume of task data that needs to be transferred from each overloaded node;

obtaining a proportion of tasks to be received by each idle node according to predicted execution time of each idle node and the standard execution time, and obtaining, according to the proportion of tasks to be received by each idle node, a volume of task data that is capable of being received by each idle node; and sequentially transferring out, according to a volume, corresponding to the overloaded node, of task data that needs to be transferred, task data of each overloaded node in a descending order of predicted execution time of overloaded nodes, and sequentially transferring the task data into at least one idle node, which is sequenced in an ascending order of predicted execution time of idle nodes, according to the volume of task data that is capable of being received by each idle node, until all task data that needs to be transferred from the overloaded nodes is transferred completely.

19. The method according to claim 18, wherein the obtaining a proportion of tasks to be transferred from each overloaded node according to predicted execution time of each overloaded node and the standard execution time, and obtaining, according to the proportion of tasks to be transferred from each overloaded node, a volume of task data that needs to be transferred from each overloaded node comprises:

dividing a difference between the predicted execution time of each overloaded node and the standard execution time by the standard execution time, to obtain the proportion of tasks to be transferred from the overloaded node; and multiplying a task data volume of task data stored on each overloaded node by the proportion of tasks to be transferred from the overloaded node, to obtain the volume of task data that needs to be transferred from the overloaded node; and the obtaining a proportion of tasks to be received by each idle node according to predicted execution time of each idle node and the standard execution time, and obtaining, according to the proportion of tasks to be received by each idle node, a volume of task data that is capable of being received by each idle node comprises:

dividing an absolute value of a difference between the predicted execution time of each idle node and the standard execution time by the standard execution time, to obtain the proportion of tasks to be received by the idle node; and multiplying a task data volume of task data stored on each idle node by the proportion of tasks to be received by the idle node, to obtain the volume of task data that is capable of being received by the idle node.

20. The method according to claim 16, wherein the execution status information of each computing subnode in the $N^{th}$ round of iteration of the task comprises: at least one of actual execution time, a computing resource usage, or a task data volume of each computing subnode in the $N^{th}$ round of iteration of the task; and the computing resource usage comprises: at least one of a CPU usage or a memory usage.

21. The method according to claim 20, wherein the determining, according to the execution status information of each computing subnode, whether load balancing needs to be performed in the $(N+1)^{th}$ round of iteration of the task comprises:

determining, among all the computing subnodes in the $N^{th}$ round of iteration of the task, a computing subnode with longest actual execution time and a computing subnode with shortest actual execution time;

obtaining an actual-execution-time difference proportion between the computing subnode with the longest actual execution time and the computing subnode with the shortest actual execution time; and comparing the time difference proportion with a preset difference proportion threshold; and if the time difference proportion is less than or equal to the preset difference proportion threshold, determining that load balancing does not need to be performed in the $(N+1)^{th}$ round of iteration of the task; or if the time difference proportion is greater than the preset difference proportion threshold, determining that load balancing needs to be performed in the $(N+1)^{th}$ round of iteration of the task.

* * * * *